(12) United States Patent
Yao et al.

(10) Patent No.: US 11,193,016 B2
(45) Date of Patent: *Dec. 7, 2021

(54) CURABLE AND CURED COMPOSITIONS

(71) Applicant: 3M INNOVATIVE PROPERTIES COMPANY, St. Paul, MN (US)

(72) Inventors: Li Yao, Woodbury, MN (US); Rajdeep S. Kalgutkar, Woodbury, MN (US); Mario A. Perez, Burnsville, MN (US); Wayne S. Mahoney, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/250,019

(22) PCT Filed: Apr. 25, 2019

(86) PCT No.: PCT/IB2019/053424
§ 371 (c)(1),
(2) Date: Nov. 4, 2020

(87) PCT Pub. No.: WO2019/215533
PCT Pub. Date: Nov. 14, 2019

(65) Prior Publication Data
US 2021/0122915 A1 Apr. 29, 2021

Related U.S. Application Data

(60) Provisional application No. 62/668,954, filed on May 9, 2018.

(51) Int. Cl.
*C08L 63/00* (2006.01)
*C09J 163/00* (2006.01)

(52) U.S. Cl.
CPC ............. *C08L 63/00* (2013.01); *C09J 163/00* (2013.01); *C08L 2205/025* (2013.01); *C08L 2205/03* (2013.01)

(58) Field of Classification Search
CPC ................................................ C08L 63/00–10
See application file for complete search history.

(56) References Cited

U.S. PATENT DOCUMENTS

| | | | |
|---|---|---|---|
| 2,705,223 A | 3/1955 | Renfrew | |
| 3,377,303 A | 4/1968 | Peerman | |
| 3,496,250 A | 2/1970 | Czerwinski | |
| 3,595,887 A | 7/1971 | Kulkarni | |
| 3,639,928 A | 2/1972 | Bentley | |
| 5,424,371 A | 6/1995 | Frihart | |
| 6,008,313 A | 12/1999 | Walker | |
| 7,229,683 B2 | 6/2007 | Fischer | |
| 7,744,991 B2 | 6/2010 | Fischer | |
| 2007/0027233 A1 | 2/2007 | Yamaguchi | |
| 2009/0048422 A1* | 2/2009 | Tsai | C08L 63/10 528/106 |
| 2011/0152448 A1* | 6/2011 | Corley | C08G 59/504 524/588 |
| 2013/0037213 A1 | 2/2013 | Frick | |
| 2013/0225725 A1 | 8/2013 | Campbell | |
| 2015/0252012 A1 | 9/2015 | Ripplinger | |
| 2016/0200075 A1 | 7/2016 | Dietze | |

FOREIGN PATENT DOCUMENTS

| | | |
|---|---|---|
| EP | 0442700 | 8/1991 |
| WO | WO 1991-15550 | 10/1991 |
| WO | WO 2000-35986 | 6/2000 |
| WO | WO 2010-130996 | 11/2010 |
| WO | WO 2012-021258 | 2/2012 |
| WO | WO 2019-070819 | 4/2019 |
| WO | WO 2019-155327 | 8/2019 |

OTHER PUBLICATIONS

Riew, "Rubbery-Modified Thermoset Resins", Advances in Chemistry Series No. 208, American Chemical Society, Washington, 1984, 8 pages.
International Search Report for PCT International Application No. PCT/IB2019/053424, dated Jul. 25, 2019, 5 pages.

* cited by examiner

*Primary Examiner* — Ana L. Woodward
(74) *Attorney, Agent, or Firm* — Jean A. Lown

(57) ABSTRACT

Curable compositions, cured compositions formed from the curable compositions, and articles containing the cured compositions are provided. The curable compositions include (a) a curable component that includes (1) an epoxy resin, (2) a polyamide composition, (3) a multifunctional amine compound, and (4) a multifunctional (meth)acrylate compound and (b) an optional inorganic filler. The curable composition can result in the formation of cured compositions with properties such as good tensile strength, good elongation at break, good overlap shear strength, good adhesion to substrates such as metal substrates, or a combination thereof.

16 Claims, No Drawings

CURABLE AND CURED COMPOSITIONS

CROSS REFERENCE TO RELATED APPLICATIONS

This application is a national stage filing under 35 U.S.C. 371 of PCT/IB2019/053424, filed Apr. 25, 2019, which claims the benefit of U.S. Provisional Patent Application No. 62/668,954, filed May 9, 2018, the disclosure of which is incorporated by reference herein its entirety.

FIELD

The present invention generally relates to curable compositions. The curable compositions may be used, for example, as structural adhesives.

BACKGROUND

Curable compositions based on epoxy resins and polyamide resins have been disclosed in the art. Such curable compositions are described in, for example, U.S. Pat. No. 2,705,223 (Renfrew et al.), U.S. Pat. No. 6,008,313 (Walker et al.), and PCT Publication WO 91/15550 (Kinzelmann et al.).

SUMMARY

Curable compositions, cured compositions formed from the curable compositions, and articles containing the cured compositions are provided. The curable compositions include an epoxy resin, a polyamide, a multifunctional amine, a multifunctional (meth)acrylate, and an optional inorganic filler. The cured compositions can be used as structural adhesives or coatings in various articles. The curable compositions can advantageously react rapidly to provide good green strength in advance of the final curing reaction.

In a first aspect, a curable composition is provided that contains a curable component and an optional inorganic filler. The curable component contains an epoxy resin, a polyamide composition, a multifunctional amine compound having 2 to 20 carbon atoms, and a multifunctional (meth)acrylate compound. The polyamide composition contains a first polyamide having a tertiary amide in a polymeric backbone thereof and having at least 2 terminal amino groups. The curable composition contains 0 to less than 25 weight percent of the optional inorganic filler based on a total weight of the curable composition.

In a second aspect, a cured composition is provided that contains a cured reaction product of the curable composition described above in the first aspect.

In a third aspect, an article is provided that contains a substrate and a cured composition positioned adjacent to the substrate. The cured composition is the same as described in the second aspect.

DETAILED DESCRIPTION

Curable compositions, cured compositions formed from the curable compositions, and articles containing the cured compositions are provided. The cured compositions can be used, for example, in the articles as a coating or as a structural or semi-structural adhesive. The curable compositions are advantageously free of isocyanates and have good adhesion to various substrates such as metal substrates. Curable compositions that are partially cured at room temperature for about 30 minutes have sufficient strength for handling without breaking or cracking. This is particularly advantageous when the curable compositions are used as structural or semi-structural adhesives.

The curable compositions include (a) a curable component that includes (1) an epoxy resin, (2) a polyamide composition, (3) a multifunctional amine compound, and (4) a multifunctional (meth)acrylate compound and (b) an optional inorganic filler. The curable composition can result in the formation of cured compositions with properties such as good tensile strength, good elongation at break, good overlap shear strength, good adhesion to substrates such as metal substrates, or a combination thereof.

More particularly, the multifunctional amine compound and the multifunctional (meth)acrylate compound in the curable compositions react via a Michael addition reaction. This reaction, which occurs more rapidly than the addition reaction between the epoxy resin and the polyamide, generates heat. The heat that is generated facilitates the reaction of other materials in the curable composition. This can result in the rapid formation of a polymeric network in the partially cured composition that has good green strength. The slower reaction between the epoxy resin and the polyamide provides good final strength to the cured composition.

While the curable composition can be a one-part composition, it is often a multi-part composition such as a two-part composition. That is, the curable composition is separated into two or more parts (often two parts) to prevent premature reaction until the curable composition is suitably positioned on a substrate prior to curing. The polyamide composition and the multifunctional amine compound are often in a first part, which can be referred to as Part A. The epoxy resin and the multifunctional (meth)acrylate compound are often in a second part, which can be referred to as Part B. If the curable composition contains optional inorganic filler, the inorganic filler can be in Part A, Part B, or both Part A and Part B. Other optional materials can be included in Part A, Part B, or both.

As used herein, the terms "a", "an", and "the" encompass embodiments having plural referents, unless the context clearly dictates otherwise.

The term "or" is generally employed in its usual sense including "and/or" unless the context clearly dictates otherwise. The term "and/or" such as A and/or B means A alone, B alone, or both A and B.

The term "aliphatic" refers to a non-aromatic group or compound. The aliphatic group or compound can include heteroatoms such as oxygen, nitrogen, and sulfur. In some instances, the aliphatic group can have 1 to 40 carbon atoms or 1 to 30 carbon atoms. The aliphatic group or compound can be saturated or unsaturated (but not aromatic).

The term "cycloaliphatic" refers to cyclic aliphatic compound or group or to an aliphatic group or compound having a portion that is cyclic. In some instances, the cycloaliphatic group or compound has 3 to 40 carbon atoms or 3 to 30 carbon atoms.

The term "alkyl" refers to a monovalent group that is a radical of an alkane and includes groups that are linear, branched, cyclic, bicyclic, or a combination thereof. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Example alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a di-radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Example alkylene groups include methylene, ethylene, 1,3-propylene, 1,2-propylene, 1,4-butylene, 1,4-cyclohexylene, and 1,4-cyclohexyldimethylene.

The term "alkenylene" refers to a divalent group that is a di-radical of an alkene and includes groups that are linear, branched, cyclic, bicyclic, or a combination thereof. Unless otherwise indicated, the alkenylene group typically has 2 to 30 carbon atoms, 2 to 20 carbon atoms, 2 to 10 carbon atoms, 2 to 6 carbon atoms, or 2 to 4 carbon atoms. There is one of more carbon-carbon double bonds.

The term "aromatic" refers an aromatic group or compound that typically has 3 to 40 carbon atoms or 3 to 30 carbon atoms. The aromatic group or compound can be carbocyclic, heterocyclic containing one or more of the heteroatoms (O, N, or S). The aromatic ring can have one ring or can have multiple fused rings that are each carbocyclic or heterocyclic.

The term "aryl" refers to a monovalent group that is aromatic and carbocyclic. The aryl has at least one aromatic ring. Optionally, the aromatic ring can have one or more additional carbocyclic rings that are fused to the aromatic ring. Any additional rings can be unsaturated, saturated, or aromatic. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and carbocyclic. The arylene has at least one aromatic ring. Optionally, the aromatic ring can have one or more additional carbocyclic rings that are fused to the aromatic ring. Any additional rings can be unsaturated, saturated, or aromatic. Unless otherwise specified, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group); the aralkyl group can be viewed as being an alkylene bonded to an aryl. Unless otherwise indicated, the alkyl (or alkylene) portion often has 1 to 10 carbon atoms, 1 to 6 carbon atoms, or 1 to 4 carbon atoms and the aryl portion often has 6 to 20 carbon atoms, 6 to 18 carbon atoms, 6 to 16 carbon atoms, 6 to 12 carbon atoms, or 6 to 10 carbon atoms.

The term "alkaryl" refers to a monovalent group that is an aryl substituted with an alkyl group (e.g., as in a tolyl group); the alkaryl can be viewed as being an arylene bonded to an alkyl. Unless otherwise indicated, the alkyl portion often has 1 to 10 carbon atoms, 1 to 6 carbon atoms, or 1 to 4 carbon atoms and an aryl (or arylene) portion often has 6 to 20 carbon atoms, 6 to 18 carbon atoms, 6 to 16 carbon atoms, 6 to 12 carbon atoms, or 6 to 10 carbon atoms.

The term "curable" refers to a composition that can be cured. The terms "cure" and "cured" refer to joining polymer chains together by covalent chemical bonds, usually via crosslinking molecules or groups, to form a polymeric network. Therefore, in this disclosure the terms "cured" and "crosslinked" may be used interchangeably. A cured or crosslinked polymer is generally characterized by insolubility, but may be swellable in the presence of an appropriate solvent.

The term "curable composition" refers to a total reaction mixture that is subjected to curing. As used herein, the curable composition contains both a curable component and optional inorganic filler.

The term "curable component" as used herein refers to the curable composition minus any optional inorganic filler that may be present. The curable component includes reactive materials such as the epoxy resin, the polyamide composition, the multifunctional (meth)acrylate compound, the multifunctional amine compound, and an optional (but usually preferred) catalyst. The curable component can further include any optional materials, which may or may not be reactive, that are not inorganic fillers.

The term "cured composition" refers to the cured reaction product of the curable composition. It includes the cured product of the curable component plus any optional inorganic filler.

The term "heteroalkyl" refers to a monovalent group that is an alkyl in which a carbon that is positioned between two other carbon atoms is replaced with a heteroatom selected from oxygen, sulfur, or nitrogen. Unless otherwise indicated, the heteroalkyl has 2 to 30 carbon atoms, 2 to 20 carbon atoms, 2 to 10 carbon atoms, or 2 to 6 carbon atoms and has 1 to 10 heteroatoms, 1 to 6 heteroatoms, or 1 to 4 heteroatoms.

The term "heteroalkylene" refers to a divalent group that is an alkylene in which a carbon atom that is positioned between two other carbon atoms is replaced with a heteroatom selected from oxygen, sulfur, or nitrogen. Unless otherwise indicated, the heteroalkylene has 2 to 30 carbon atoms, 2 to 20 carbon atoms, 2 to 10 carbon atoms, or 2 to 6 carbon atoms and has 1 to 10 heteroatoms, 1 to 6 heteroatoms, or 1 to 4 heteroatoms.

The term "heteroaryl" refers to a monovalent group that is aromatic and heterocyclic. The heteroaryl has at least one heteroatom selected from oxygen, nitrogen, or sulfur in the heterocyclic ring. The heteroaryl has at least one heterocyclic aromatic ring but can have additional rings that are unsaturated, saturated, or aromatic. These additional rings can be optionally fused to the heterocyclic ring and can be heterocyclic or carbocyclic. Unless otherwise indicated, the heteroaryl groups typically contain 3 to 30 carbon atoms. In some embodiments, the heteroaryl group contains 3 to 20, 4 to 20, 5 to 20, 3 to 10, 4 to 10, or 5 to 10 carbon atoms and 1 to 4 or 1 to 3 heteroatoms.

The term "heteroarylene" refers to a divalent group that is aromatic and heterocyclic. The heteroarylene has at least one heteroatom selected from oxygen, nitrogen, or sulfur in the heterocyclic ring. The heteroarylene has at least one heterocyclic aromatic ring but can have additional rings that are unsaturated, saturated, or aromatic. These additional rings can be optionally fused to the heterocyclic ring and can be heterocyclic or carbocyclic. Unless otherwise indicated, the heteroarylene groups typically contain 3 to 30 carbon atoms. In some embodiments, the heteroaryl group contains 3 to 20, 4 to 20, 5 to 20, 3 to 10, 4 to 10, or 5 to 10 carbon atoms and 1 to 4 or 1 to 3 heteroatoms.

The term "green strength" in reference to a partially cured composition means that the partially cured composition can be handled without breaking apart. The overlap shear strength is typically at least 0.1 MPa (megaPascals), at least 0.2 MPa, or at least 0.5 MPa.

The term "(meth)acrylate" means acrylate and/or methacrylate.

The term "multifunctional amine" refers to a compound having two or more amino groups that are selected from primary amino groups and/or secondary amino groups.

The term "multifunctional (meth)acrylate" refers to a compound having two or more (meth)acryloyl groups of formula —(CO)—CR=CH$_2$, where —(CO)— is a carbonyl group and R is hydrogen (for an acryloyl group) or methyl (for a methacryloyl group).

The term "polymeric backbone" refers to the main continuous chain of a polymer.

The term "room temperature" refers to a temperature of 22° C. to 25° C.

The recitation of numerical ranges by endpoints includes the endpoints, all numbers within that range (e.g., 1 to 5 includes 1, 1.5, 2, 2.75, 3, 3.80, 4, and 5), and any range within that range.

Epoxy Resin

The curable component (as well as the curable composition) includes at least one epoxy resin. The epoxy resin typically contains at least two epoxide groups (i.e., oxirane groups) per molecule. As used herein, the term epoxide group refers to the following divalent group.

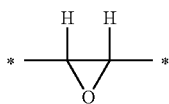

The asterisks denote a site of attachment of the epoxide group to another group. If the epoxide group is at the terminal position of the epoxy resin, the epoxide group is typically bonded to a hydrogen atom.

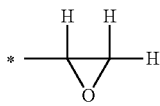

The epoxy resin often has 2 to 10, 2 to 6, or 2 to 4 epoxide groups per molecule. The epoxide groups are usually part of a glycidyl group as shown below.

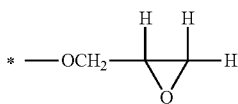

Suitable epoxy resins may include aromatic polyepoxide resins (e.g., a chain-extended diepoxide or novolac epoxy resin having at least two epoxide groups), aromatic monomeric diepoxides, aliphatic polyepoxide, or aliphatic monomeric diepoxides. The aromatic polyepoxide or aromatic monomeric diepoxide typically contains at least one (in some embodiments, at least 2; in some embodiments, in a range of 1 to 4 or from 2 to 4) aromatic ring that is optionally substituted by a halogen (e.g., fluoro, chloro, bromo, or iodo), alkyl having 1 to 4 carbon atoms (e.g., methyl or ethyl), or hydroxyalkyl having 1 to 4 carbon atoms (e.g., hydroxymethyl). For epoxy resins containing two or more aromatic rings, the rings may be connected, for example, by a branched or straight-chain alkylene group having 1 to 4 carbon atoms that may optionally be substituted by halogen (e.g., fluoro, chloro, bromo, or iodo).

Examples of aromatic epoxy resins that are useful include novolac epoxy resins (e.g., phenol novolacs, ortho-, meta-, or epoxy resin para-cresol novolacs or combinations thereof), bisphenol epoxy resins (e.g., bisphenol A, bisphenol F, halogenated bisphenol epoxies, and combinations thereof), resorcinol epoxy resins, tetrakis phenylolethane epoxy resins, and combinations of any of these. Useful epoxy compounds include diglycidyl ethers of difunctional phenolic compounds (e.g., p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane). In some embodiments, the epoxy resin includes a bisphenol diglycidyl ether, wherein the bisphenol (i.e., —O—C$_6$H$_5$—CH$_2$—C$_6$H$_5$—O— group) may be unsubstituted (e.g., bisphenol F), or wherein either of the phenyl rings or the methylene group may be substituted by one or more halogens (e.g., fluoro, chloro, bromo, or iodo), methyl groups, trifluoromethyl groups, or hydroxymethyl groups.

Examples of aromatic monomeric diepoxides useful in the curable component as the epoxy resin include, but are not limited to, the diglycidyl ether of bisphenol A, the diglycidyl ether of bisphenol F, and mixtures thereof. Bisphenol epoxy resins, for example, may be chain extended to have any desirable epoxy equivalent weight. Chain extending epoxy resins can be carried out by reacting a monomeric diepoxide, for example, with a bisphenol in the presence of a catalyst to make a linear polymer.

The aromatic epoxy resin (e.g., either a bisphenol epoxy resin or a novolac epoxy resin) often has an epoxy equivalent weight of at least 150, 170, 200, or 225 grams per equivalent. The epoxy equivalent weight can be up to 2000, 1500, or 1000 grams per equivalent. In some embodiments, the aromatic epoxy resin may have an epoxy equivalent weight in a range of 150 to 2000, 150 to 1000, or 170 to 900 grams per equivalent. For example, the epoxy resin can have an epoxy equivalent weight in a range of 150 to 450, 150 to 350, or 150 to 300 grams per equivalent. Epoxy equivalent weights may be selected, for example, so that the epoxy resin may be used as a liquid or solid, as desired.

In some embodiments, in addition or as an alternative to aromatic epoxy resins, the epoxy resins may include one or more non-aromatic epoxy resins. In some cases, non-aromatic (i.e., aliphatic) epoxy resins can be useful as reactive diluents that may help control the flow characteristics of the compositions. Non-aromatic epoxy resins useful in the curable compositions include, for example, a branched or straight-chain alkylene group having 1 to 25 carbon atoms optionally interrupted with at least one —O— and optionally substituted by hydroxyl. In some embodiments, the non-aromatic epoxy can include a poly(oxyalkylene) group having a plurality (x) of oxyalkylene groups, —OR$^1$—, wherein each R$^1$ is independently an alkylene having 2 to 5 carbon atoms. In some embodiments, R$^1$ is an alkylene with 2 to 4 carbon atoms, x is 2 to about 6 (or even higher), 2 to 5, 2 to 4, or 2 to 3. To become crosslinked into a network, useful non-aromatic epoxy resins will typically have at least two epoxy end groups.

Examples of useful non-aromatic epoxy resins include glycidyl epoxy resins such as those based on diglycidyl ether compounds comprising one or more oxyalkylene units. Examples of these include epoxy resins include ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, glycerol triglycidyl ether, propanediol diglycidyl ether, butanediol diglycidyl ether, and hexanediol diglycidyl ether. Other useful non-aromatic epoxy resins include a diglycidyl ether of cyclohexane dimethanol, a diglycidyl ether of neopentyl glycol, a triglycidyl ether of trimethylolpropane, and a diglycidyl ether of 1,4-butanediol.

In some embodiments, the epoxy resins may be liquid at room temperature. Several suitable epoxy resins are commercially available. For example, several epoxy resins of various classes and epoxy equivalent weights are available from Dow Chemical Company, Midland, Mich., USA; Hexion, Inc., Columbus, Ohio, USA; Huntsman Advanced Materials, The Woodlands, Tex., USA; CVC Specialty Chemicals Inc., Akron, Ohio, USA (acquired by Emerald Performance Materials); and Nan Ya Plastics Corporation, Taipei City, Taiwan. Examples of commercially available glycidyl ethers include diglycidyl ethers of bisphenol A (e.g., those available under the trade designations "EPON" from Hexion Inc., Columbus, Ohio, USA (e.g., EPON 828 and EPON 1001), those available under the trade designation "D.E.R." from Dow Chemical Co. (e.g., D.E.R. 331, 332, and 334), those available under the trade designation "EPICLON" from Dainippon Ink and Chemicals, Inc. (e.g., EPICLON 840 and 850), and those available under the trade designation "YL-980" from Japan Epoxy Resins Co., Ltd.)); diglycidyl ethers of bisphenol F (e.g., those available under the trade designation "EPICLON" from Dainippon Ink and Chemicals, Inc. (e.g., EPICLON 830)); polyglycidyl ethers of novolac resins (e.g., novolac epoxy resins, such as those available under the trade designation "D.E.N." from Dow Chemical Co. (e.g., D.E.N. 425, 431, and 438)); and flame retardant epoxy resins (e.g., "D.E.R. 580", a brominated bisphenol type epoxy resin available from Dow Chemical Co.). Examples of commercially available non-aromatic epoxy resins include the diglycidyl ether of cyclohexane dimethanol, available from Hexion Inc., Columbus, Ohio, USA under the trade designation HELOXY MODIFIER 107 and the diglycidyl ether of hydrogenated bisphenol-A epoxy resin, available from Hexion under the trade designation EPONEX 1510.

The amount of the epoxy resin is typically 5 to 50 weight percent based on a total weight of the curable component (e.g., the total weight of the epoxy resin, polyamide composition, multifunctional amine compound, multifunctional (meth)acrylate compound, and optional catalyst). The amount of the epoxy resin is often at least 5 weight percent, at least 10 weight percent, at least 15 weight percent, at least 20 weight percent, at least 25 weight percent, at least 30 weight percent and up to 50 weight percent, up to 45 weight percent, up to 40 weight percent, up to 35 weight percent, up to 30 weight percent, up to 25 weight percent, or up to 20 weight percent. For example, the amount of the epoxy resin can be in a range of 5 to 40 weight percent, 5 to 30 weight percent, 5 to 20 weight percent, 10 to 50 weight percent, 10 to 40 weight percent, 10 to 30 weight percent, 10 to 25 weight percent, 15 to 50 weight percent, 15 to 40 weight percent, 15 to 30 weight percent, or 15 to 25 weight percent.

Polyamide Composition

The polyamide composition is typically a liquid (e.g., a viscous liquid having a viscosity in a range of 500 to about 1,000,000 centipoise (cP) or in a range of 1000 to 750,000 cP, or in a range of 5000 to 500,000 cP) at room temperature. The polyamide composition contains one or more polyamides. The structure and molecular weights of the one or more polyamides can be adjusted to obtain a curable composition with the desired viscosity. Polyamide-compatible dispersants may also be added to further reduce the viscosity of the polyamide composition and the curable composition.

The polyamide composition contains at least one polyamide, which is referred to as a first polyamide. The first polyamide has one or more tertiary amido groups in its polymeric backbone. Generally, it is believed that the presence of the tertiary amido groups can enhance flexibility and elongation at break at room temperature by reducing the volume density of hydrogen bonding and crosslinking, while maintaining good adhesion to substrates such as metal substrates. In addition to the tertiary amides, the first polyamide can contain secondary amides along the polyamide backbone.

In many embodiments, the first polyamide contains tertiary amido groups in an amount of at least 30 mole percent, at least 40 mole percent, at least 50 mole percent, at least 60 mole percent, at least 70 mole percent, at least 75 mole percent, at least 80 mole percent, at least 85 mole percent, at least 90 mole percent, at least 95 mole percent, at least 97 mole percent, at least 99 mole percent, or 100 mole percent based on the total amido content of the first polyamide polymer backbone. The amount can be up to 100 mole percent, up to 97 mole percent, up to 95 mole percent, or up to 90 mole percent. For example, the amount can be in a range of 30 to 100 mole percent, 40 to 100 mole percent, 50 to 100 mole percent, 70 to 100 mole percent, 90 to 100 mole percent, 50 to 99 mole percent, 70 to 99 mole percent, 90 to 99 mole percent, 95 to 100 mole percent, 95 to 99 mole percent, or 99 to 100 mole percent based on the total amido content in the first polyamide.

Any amido group in the first polyamide that is not a tertiary amido group is typically a secondary amido group. Thus, the first polyamide can contain less than 70 mole percent secondary amido groups. The amount of secondary amido groups is usually no greater than 60 mole percent, no greater than 50 mole percent, no greater than 40 mole percent, no greater than 30 mole percent, no greater than 20 mole percent, no greater than 10 mole percent, no greater than 5 mole percent, no greater than 3 mole percent, no greater than 2 mole percent, no greater than 1 mole percent, or 0 mole percent. For example, the amount can be in a range of 0 to 70 mole percent, 0 to 50 mole percent, 0 to 30 mole percent, 0 to 20 mole percent, or 0 to 10 mole percent based on the total amido content of the first polyamide.

In addition to the first polyamide, the polyamide composition can further include other optional polyamides, which are referred to as second polyamides, that either lack the tertiary amido group or that contain less than 30 mole percent tertiary amido groups based on the total amido content of the second polyamide. The amount can be at up to 25 mole percent, up to 20 mole percent, up to 15 mole percent, up to 10 mole percent, or up to 5 mole percent based on the total amido content of the second polyamide. It there are any tertiary amido groups, the amount is often at least 1 mole percent, at least 2 mole percent, at least 3 mole percent, or at least 5 mole percent. The amount of tertiary amido groups in the second polyamide can be in a range of 0 to less than 30 mole percent, 0 to 25 mole percent, 0 to 20 mole percent, 0 to 10 mole percent, 0 to 5 mole percent, 1 to 25 mole percent, 1 to 20 mole percent, or 1 to 10 mole percent.

Any amido group in the second polyamide that is not a tertiary amido group is typically a secondary amido group. Thus, the second polyamide can contain at least 70 mole percent secondary amido groups based on total moles of amido groups in the second polyamide. The amount of secondary amido groups is usually at least 75 mole percent, at least 80 mole percent, at least 85 mole percent, at least 90 mole percent, at least 95 mole percent, at least 97 mole percent, at least 98 mole percent, at least 99 mole percent, or 100 mole percent secondary amido groups.

Both the first polyamide and any optional second polyamide included in the polyamide composition have terminal groups (e.g., at least 2 terminal groups) containing a primary amino group, a secondary amino group, or both. That is the terminal group includes a —NH$_2$ group or a —NHR$^2$ group where R$^2$ is alkyl, aryl, aralkyl, or alkaryl. Group R$^2$ is often an alkyl. The terminal groups can react with the epoxy resin and/or the multifunctional (meth)acrylate compound during the curing process.

The polyamides included in the polyamide composition (both the first polyamide and the second polyamide) are often the reaction product (e.g., by condensation polymerization) of (1) a diacid component and (2) a diamine component. The diacid of often a dicarboxylic acid component. In some embodiments, the reaction mixture used to form the polyamide contains an optional triamine component and/or an optional triacid component. The amounts of any triamine and/or triacid component is controlled so that the resulting polyamide is not crosslinked. That is, in most embodiments, the polyamides included in the polyamide composition are liquids or flowable at room temperature.

The diacid component used to form the polyamide often contains a long chain diacid (e.g., diacids that have greater than 15, greater than 20, greater than 25, or even greater than 30 carbon atoms). The diacid component may further include a short chain diacid (e.g., diacids that have at least 2, at least 3, at least 4, at least 5 and up to 15, up to 12, or up to 10 carbon atoms). In some embodiments, the long chain diacid may be present in the diacid component in an amount of at least 80 mole percent, at least 85 mole percent, at least 90 mole percent, or at least 95 mole percent and up to 100 mole percent, up to 99 mole percent, or up to 95 mole percent. For example, the amount of the long chain diacid can be in a range of 80 to 100 mole percent, 85 to 100 mole percent, 90 to 100 mole percent, 95 to 100 mole percent, 80 to 99 mole percent, or 80 to 95 mole percent based on the total moles of the diacid component. In some embodiments, the short chain diacid may not be present in the diacid component, or may be present in the diacid component in an amount up to 20 mole percent, up to 15 mole percent up to 10 mole percent, or up to 5 mole percent. For example, the short chain diacid may be present in an amount in a range of 0 to 20 mole percent, 1 to 20 mole percent, 5 to 20 mole percent, 0 to 15 mole percent, 1 to 15 mole percent, 5 to 15 mole percent, 0 to 10 mole percent, 1 to 10 mole percent, 5 to 10 mole percent, 0 to 5 mole percent, or 1 to 5 mole percent based on the total moles of the diacid component. Both the long chain diacid and the short chain diacid are typically carboxylic acids. Mixtures of two or more diacids such as dicarboxylic acids may aid in disrupting the structural regularity of the polyamide, thereby significantly reducing or eliminating crystallinity in the resulting polyamide produced upon condensation with the diamine component.

Example long and/or short diacids (dicarboxylic acids) can include an alkylene group, alkenylene group, arylene group, heteroarylene group, or a combination thereof with 3 to 30 carbon atoms plus two carboxylic acid groups. Useful dicarboxylic acids include, but are not limited to, propanedioic acid, butanedioic acid, pentanedioic acid, hexanedioic acid, heptanedioic acid, octanedioic acid, nonanedioic acid, decanedioic acid, undecanedioic acid, dodecanedioic acid, hexadecanedioic acid, (Z)-butenedioic acid, (E)-butenedioic acid, pent-2-enedioic acid, dodec-2-enedioic acid, (2Z)-2-methylbut-2-enedioic acid, and (2E,4E)-hexa-2,4-dienedioic acid. Example aromatic dicarboxylic acids include, but are not limited to, phthalic acid, isophthalic acid, terephthalic acid and 2,6-naphthalenedicarboxylic acid.

In some embodiments, the long dicarboxylic acid is a dimer acid, which is a dimer of a fatty acid. The phrase "fatty acid," as used herein refers to an organic compound that contains at least one alkylene or alkenylene group with 4 to 28 carbon atoms or 5 to 22 carbon atoms that is terminated with a carboxylic acid group. The alkylene or alkenylene groups are usually linear. The phrase "dimer acid" refers to dimerized fatty acids that contain two carboxylic acid groups. The dimer acid may be saturated or partially unsaturated.

The term dimer acid often refers to the dimer of fatty acids that contain 18 carbon atoms such as stearic acid, oleic acid, linoleic acid. Both soy oil and tall oil contain a large amount of C$_{18}$ fatty acids. The dimer acids are often at least partially unsaturated and often contain 36 carbon atoms. The dimer acids often contain a mixture of various acids that are predominately 36-carbon dicarboxylic acids. The structure of the dimer acid may be acyclic, cyclic (monocyclic or bicyclic) or aromatic, as shown below.

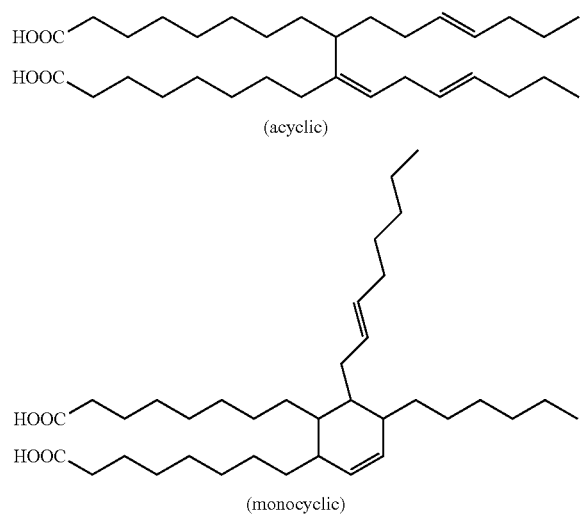

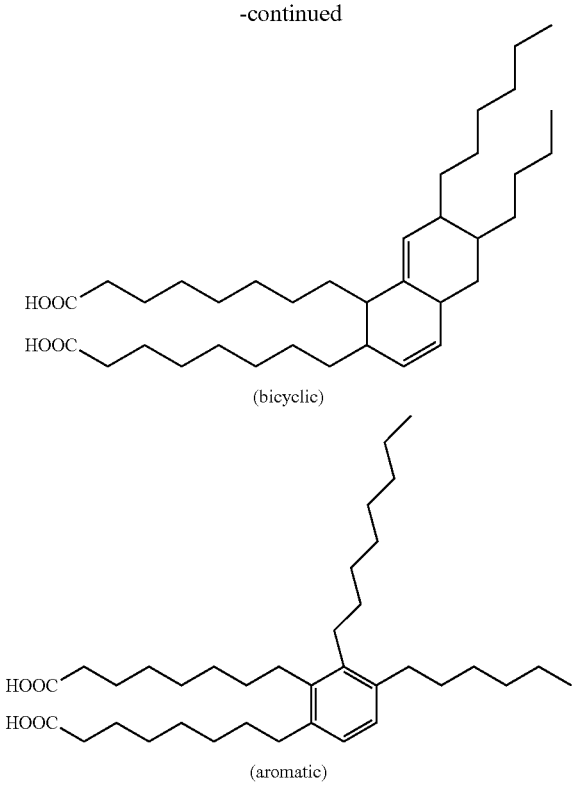
(bicyclic)

(aromatic)

The dimer acids may be prepared by condensing unsaturated monofunctional carboxylic acids such as oleic, stearic, linoleic, soya or tall oil acid through their olefinically unsaturated groups, in the presence of catalysts such as acidic clays. The distribution of the various structures in dimer acids (nominally $C_{36}$ dicarboxylic acids) depends upon the unsaturated acid used in their manufacture. Typically, oleic acid gives a dicarboxylic dimer acid containing about 38 weight percent acyclic, about 56 weight percent monocyclic and/or bicyclic, and about 6 weight percent aromatic. Soya oil acid gives a dicarboxylic dimer acid containing about 24 weight percent acyclic, about 58 weight percent monocyclic and/or bicyclic, and about 18 weight percent aromatic. Tall oil acid gives a dicarboxylic dimer acid containing about 13 weight percent acyclic, about 75 weight percent monocyclic and/or bicyclic, and about 12 weight percent aromatic. The dimerization procedure can also produce trimer acids.

Commercial dimer acid products are typically purified by distillation to produce a range of dicarboxylic acid content. Useful dimer acids contain at least 80 weight percent dicarboxylic acid, more preferably at least 85 weight percent or at least 90 weight percent dicarboxylic acid content, or even more preferably at least 95 weight percent dicarboxylic acid content. For certain applications, it may be advantageous to further purify the dimer acid by color reduction techniques including hydrogenation of the unsaturated groups, as disclosed in U.S. Pat. No. 3,595,887 (Kulkarni et al.). Hydrogenated dimer acids may also provide increased oxidative stability at elevated temperatures. Example dicarboxylic dimer acids are commercially available under the trade designation EMPOL (e.g., EMPOL1008 and EMPOL1061) from BASF, Florham Park, N.J., USA and under the trade designation PRIPOL (e.g., PRIPOL 1006, PRIPOL 1009, PRIPOL 1013, PRIPOL 1017, and PRIPOL 1025) from Croda Inc., Edison, N.J., USA.

The number average molecular weight of the dicarboxylic dimer acid is often at least 300 grams/mole (g/mol), at least 400 g/mol, at least 500 g/mol, at least 600 g/mole, or at least 800 g/mol and can be up to 1400 g/mol, up to 1200 g/mol, up to 1000 g/mol, or up to 800 g/mol. For example, the number average molecular weight can be in a range of 300 g/mole to 1400 g/mol, in a range of 300 g/mol to 1200 g/mol, in a range of 300 g/mol to 1000 g/mol, or even in a range of 300 g/mol to 800 g/mol. In some embodiments, the number of carbon atoms in the dicarboxylic dimer acid may be between from 12 to 100, between from 20 to 100, between from 30 to 100, between from 12 to 80, between from 20 to 80, between from 30 to 80, between from 12 to 60, between from 20 to 60 or even between from 30 to 60.

The mole fraction of dicarboxylic dimer acid included in the dicarboxylic acid component used to form the polyamide may be in a range of 0.10 to 1.00 (i.e., this corresponds to 10 to 100 mole percent) based on the total moles of dicarboxylic acid. That is the mole fraction can be at least 0.10, at least 0.20, at least 0.30, at least 0.40, at least 0.50, at least 0.60, at least 0.70, at least 0.80, at least 0.90 and can be up to 1.00, up to 0.98, up to 0.95, up to 0.90, up to 0.85, or up to 0.80. In some embodiments, the mole fraction of dicarboxylic dimer acid is in a range of 0.20 to 1.00, in a range of 0.30 to 1.00, in a range of 0.50 to 1.00, in a range of 0.70 to 1.00, in a range of 0.80 to 1.00, in a range of 0.90 to 1.00, in a range of 0.50 to 0.98, in a range of 0.70 to 0.98, in a range of 0.80 to 0.98, or in a range of 0.90 to 0.98, based on the total moles of dicarboxylic acid. In some embodiments, the mole fraction of dicarboxylic dimer acid is 1.00 based on the total moles of dicarboxylic acid. Mixtures of two or more dimer acids may be used.

In some embodiments, it can be beneficial to use a dicarboxylic dimer acid to form the polyamides. The dimer acid is a renewable resource and is typically a mixture of different diacids. The use of a mixture of diacids tends to favor the formation of a non-crystalline (amorphous) polyamide. Additionally, the long chain lengths of the dimer acids tend to impart flexibility to the resulting polyamide.

In some embodiments, in addition to the diacid component, the reactants used to form the polyamide may contain a triacid such as a tricarboxylic acid. The presence of the triacid will typically not cause gelation when the ratio of moles of amine hydrogen to moles of acidic groups is greater than or equal to 2. Suitable tricarboxylic acids include, but are not limited to, citric acid, 1,2,3-propanetricarboxylic acid, 1,2,4-butanetricarboxylic acid, 1,3,5-tris(2-carbxoyethyl)isocyanuric acid, 1,2,4-benzenetricarboxylic acid, 1,3,5-benzenetricarboxylic acid, and 1,2,3-benzenetricarboxylic acid.

The amount of the triacid component can be in a range of 0 to 50 mole percent based on the total acid content in the reaction mixture. If present, the amount of triacid is often at least 1 mole percent, at least 2 mole percent, at least 5 mole percent, at least 10 mole percent, at least 15 mole percent, or at least 20 mole percent and up to 50 mole percent, up to 45 mole percent, up to 40 mole percent, up to 35 mole percent, up to 30 mole percent, up to 25 mole percent, or up to 20 mole percent.

The diacid component is reacted with a diamine component to form the polyamides. To form the first polyamide, the diamine component includes one or more secondary diamines and/or one or more secondary/primary hybrid diamines and, optionally, one or more primary diamines provided that the total amount of tertiary amido groups is at least 30 mole percent based on the total amido content in the primary polyamide. To form the second polyamide, the diamine component typically contains mainly primary diamines but may contain some secondary diamines and/or secondary/primary hybrid diamines provided that the total amount of tertiary amido groups is at less than 30 mole percent based on the total amido content in the primary polyamide.

The tertiary amido groups along the polymeric backbone of the first polyamide are derived from secondary amido groups in the diamine used to form the polyamide. Suitable secondary or secondary/primary hybrid diamines for preparing the polyamides are often of Formula (I).

$$R^3\text{—NH—}R^4\text{—NH—}R^5 \qquad (I)$$

In Formula (I), group $R^3$ is hydrogen, alkyl, aryl, alkaryl, aralkyl, heteroalkyl, heteroaryl, or $R^3$ combines with $R^5$ to form an alkylene group. Group $R^4$ is an alkylene, heteroalkylene, arylene, heteroarylene, or a combination thereof. Group $R^5$ is an alkyl, aryl, alkaryl, aralkyl, heteroalkyl, heteroaryl, or $R^5$ combined with $R^3$ to form an alkylene group. When $R^3$ and $R^5$ combine to form an alkylene group, the diamine of Formula (I) is a heterocyclic.

Suitable alkyl groups for $R^3$ and $R^5$ can be linear (e.g., methyl, ethyl, n-propyl), branched (e.g., isopropyl), cyclic (e.g., cyclohexyl), or a combination thereof. Suitable aryl groups for $R^3$ and $R^5$ can be unsubstituted (e.g., phenyl) or substituted with an alkyl group. Suitable heteroalkyl groups for $R^3$ and $R^5$ can be linear, branched, cyclic, or a combination thereof. The heteroalkyl group often has an oxygen heteroatom (e.g., —CH$_2$CH$_2$—O—CH$_3$). Suitable heteroaryl groups for $R^3$ and $R^5$ typically have 5 or 6 membered rings and one or 2 heteroatoms selected from oxygen or nitrogen. An example of a heteroaryl group is pyridyl. In some embodiments, the $R^3$ and $R^5$ groups combine to form an alkylene and the resulting diamine of Formula (I) is a heterocyclic compound (e.g., piperazine).

Suitable alkylene groups for $R^4$ can be linear (e.g., —CH$_2$CH$_2$— and —CH$_2$CH$_2$CH$_2$—), branched (e.g., —CH$_2$CH(CH$_3$)CH$_2$—), or cyclic (e.g., cyclohexylene). Suitable arylene $R^4$ groups can be unsubstituted or substituted with an alkyl. The arylene is often phenylene such as 1,4-phenylene. Suitable heteroalkylene groups can be linear, branched, cyclic, or a combination thereof. The heteroatom is often oxygen. In some embodiments, the heteroalkylene can be of formula —R$^8$—[O—R$^8$]$_n$— where R$^8$ is an alkylene and n is an integer equal to at least 1, at least 2, or at least 5 and can be up to 100, up to 50, up to 20, or up to 10. The alkylene portion of this formula (R$^8$) is often ethylene or propylene. Cyclic heteroalkylene can include a heterocyclic ring such as a furan ring. For example, $R^4$ can be —CH$_2$—C$_4$H$_2$O—CH$_2$—, where —C$_4$H$_2$O— is a divalent radical of furan. Suitable heteroarylene groups often have a 5 or 6-member heterocyclic ring with at least one heteroatom. The heteroatom is often nitrogen or oxygen. The heterocyclic ring can be fused to another ring that is carbocyclic or heterocyclic. The term "a combination thereof" with reference to $R^4$ means that two or more of the listed groups can be present. For example, the group can be a combination of one or more alkylene groups and one or more arylene groups or the group can be a combination of a cyclic alkylene and a linear or branched alkylene (e.g., -cyclohexene-CH$_2$-cyclohexene-).

Suitable secondary diamines may include, for example, piperazine, 1,3-di-4-piperidylpropane (CAS #16898-52-5), N,N'-dimethyl 1,4-cyclohexanediamine, and 4,4'-methylenebis[N-sec-butylaniline] (CAS #5285-60-9), and cyclohexanamine, 4,4-methylenebisN-(1-methylpropyl)- (CAS #154279-60-4). Suitable secondary/primary hybrid diamines (i.e., diamines having a secondary amine and a primary amine) include, for example, aminoethyl piperazine. In some embodiments, the secondary/primary hybrid diamines may not be present, or may be present in an amount of less than 50 mole percent, less than 30 mole percent, less than 10 mole percent, or less than 5 mole percent, based on the total moles of the secondary diamines and secondary/primary hybrid diamines amines.

In some embodiments, the diamine component used to form the polyamide may, in addition to the secondary or secondary/primary hybrid amine, include a primary diamine, such as an aliphatic or aromatic primary amine. The primary diamines are often used to prepare the second polyamide but can be used in the preparation of the first polyamide along with a diamine that has at least one secondary amino group. Some suitable primary diamines are of Formula (II).

$$H_2N\text{—}R^6\text{—}NH_2 \qquad (II)$$

In Formula (II), group $R^6$ is an alkylene, heteroalkylene, arylene, heteroarylene, or a combination thereof.

Suitable alkylene groups for $R^6$ can be linear (e.g., —CH$_2$CH$_2$— and —CH$_2$CH$_2$CH$_2$—), branched (e.g., —CH$_2$CH(CH$_3$)CH$_2$—), or cyclic (e.g., cyclohexylene). Suitable arylene $R^6$ groups can be unsubstituted or substituted with an alkyl. The arylene is often phenylene such as 1,4-phenylene. Suitable heteroalkylene groups can be linear, branched, cyclic, or a combination thereof. The heteroatom is often oxygen. In some embodiments, the heteroalkylene can be of formula —R$^8$—[O—R$^8$]$_n$— where R$^8$ is an alkylene and n is an integer equal to at least 1, at least 2, or at least 5 and can be up to 100, up to 50, up to 20, or up to 10. The alkylene portion of this formula is often ethylene or propylene. Cyclic heteroalkylene can include a heterocyclic ring such as a furan ring. For example, $R^6$ can be —CH$_2$—C$_4$H$_2$O—CH$_2$—, where —C$_4$H$_2$O— is a divalent radical of furan. Suitable heteroarylene groups often have a 5 or 6-member heterocyclic ring with at least one heteroatom. The heteroatom is often nitrogen or oxygen. The heterocyclic ring can be fused to another ring that is carbocyclic or heterocyclic. The term "a combination thereof" with reference to $R^6$ means that two or more of the listed groups can be present. For example, the group can be a combination of one or more alkylene groups and one or more arylene groups or the group can be a combination of a cyclic alkylene and a linear or branched alkylene (e.g., -cyclohexene-CH$_2$-cyclohexene-). Suitable primary amines include, for example, ethylenediamine, propylenediamine, butylenediamine, 1,6-hexanediamine, m-xylene diamine, p-diaminobenzene, m-diaminobenzene, and 1,3-benzenedimethanamine.

In some embodiments, the molecular weight (number average molecular weight) of suitable secondary diamines, secondary/primary hybrid diamines, and primary diamines may be from 30 g/mol to 5000 g/mol. The number average molecular weight can be at least 50 g/mol, at least 75 g/mol, at least 100 g/mol, at least 150 g/mol, at least 200 g/mole, at least 250 g/mol, or at least 300 g/mol and up to 4000 g/mol, up to 2000 g/mol, up to 1000 g/mol, up to 800 g/mol, up to 600 g/mol, up to 500 g/mol, up to 250 g/mol, or up to 100 g/mol.

Overall, the first polyamide contains at least 30 mole percent tertiary amido groups based on the total amido content of the first polyamide. For preparation of the first polyamide, the secondary diamines plus the secondary/primary hybrid diamines, in combination, are typically present in the diamine component in an amount of at least 90 mole percent to 100 mole percent of the total moles of diamine compounds in the diamine component. This amount is often at least 90 mole percent, at least 92 mole percent, at least 95 mole percent, at least 98 mole percent, or up to 100 mole percent, up to 99 mole percent, up to 98 mole percent, up to 95 mole percent, or up to 90 mole percent. For the first polyamide, the diamine component usually contains an amount of primary diamine in a range of 0 to 30 mole percent based on the total moles of diamine compounds in the diamine component. If the diamine component contains primary diamines, the amount is often at least 1 mole percent, at least 2 mole percent, at least 3 mole percent, at least 4 mole percent, or at least 5 mole percent and can be less than 30 mole percent, less than 25 mole percent, less than 20 mole percent, less than 15 mole percent, less than 10 mole percent, or less than 5 mole percent.

Overall, the second polyamide contains less than 30 mole percent tertiary amido groups based on the total amido content of the second polyamide. For preparation of the second polyamide, the primary diamine is typically present in an amount of at least 50 mole percent of the total moles of diamine compounds in the diamine component. If the amount of the primary diamine is less than 70 mole percent of the total moles of diamine compounds, the other diamine must be a secondary/primary hybrid diamine. It the amount of the primary diamine is at least 70 mole percent, then the other diamine can be a secondary diamine and/or a secondary/primary hybrid diamine. In many embodiments, primary diamine is present in an amount of at least 70 mole percent, at least 75 mole percent, at least 80 mole percent, at least 85 mole percent, at least 90 mole percent, at least 95 mole percent, at least 98 mole percent, or up to 100 mole percent, up to 99 mole percent, up to 98 mole percent, up to 95 mole percent, or up to 90 mole percent. For the second polyamide, the diamine component usually contains an amount of secondary diamine and/or secondary/primary hybrid diamine in an amount of 0 to less than 30 mole percent based on the total moles od diamine compounds in the diamine component. If the diamine component contains the secondary diamine and/or secondary/primary hybrid diamine, the amount is often at least 1 mole percent, at least 2 mole percent, at least 3 mole percent, at least 4 mole percent, or at least 5 mole percent and can be less than 30 mole percent, less than 25 mole percent, less than 20 mole percent, less than 15 mole percent, less than 10 mole percent, or less than 5 mole percent.

The polyamides of the polyamide composition may be formed using a conventional condensation reaction between at least one of the above described diacids and at least one of the above described diamines. Mixtures of at least two diacid types with at least one diamine, mixtures of at least two diamine types with at least one diacid type, or mixtures of at least two diacid types with at least two diamine types may be used.

In some embodiments, the reaction to form the polyamide (the first and/or second polyamide) may take place at a temperature ranging from 50 to 300° C., 75 to 250° C., or 100 to 225° C. This reaction may take place at atmospheric pressure (760 torr) or at a pressure below 300 torr, below 100 torr, below 50 torr, or below 30 torr. Completion of the reaction may be determined by the lack of evolution of water as a by-product. The reaction may also be conducted using heterogenous aqueous azeotropes such as toluene or xylene as solvents to remove the water by-product. In such a case, it may be advantageous to distill the azeotropic solvent from the product mixture once the reaction no longer produces water. Such distillations may be carried out at atmospheric pressure or under vacuum.

It is also known to those skilled in the art that the polyamide (the first and/or the second polyamide) may be formed by the reaction of the corresponding acid chlorides of the carboxylic acids (e.g., dicarboxylic acids) that are discussed above with diamines discussed above. In such cases, the reaction may be carried out in non-reactive anhydrous solvents such as toluene, xylene, tetrahydrofuran, triethylamine, at temperatures below 50° C. In such cases, it may be advantageous to distill off the solvent at the end of the reaction.

It may sometimes be desirable to include catalysts, defoamers, or antioxidants in the reaction mixture used for forming the polyamide. Phosphoric acid may be used as a catalyst in an amount ranging from 5 to 500 ppm (parts per million) based on the total reactant mass. Silicone defoamers may be employed such as those sold by Dow-Corning (Midland, Mich., US) in an amount ranging from 1 to 100 ppm. It may also be advantageous to use antioxidants such as octylated diphenylamine or phenolic antioxidants such as those sold by BASF (Ludwigshafen, Germany) under the IRGANOX trade designation (e.g., IRGANOX 1010 or IRGANOX 1035).

In some embodiments, in addition to the diamine component, the reactants used to form the polyamide may contain a triamine having three amino groups that are primary and/or secondary amino groups. The amino groups in the triamine usually contribute less than 20 mole percent of the total primary and/or secondary amino groups in the reaction mixture. The amount is often less than 15 mole percent, less than 10 mole percent, less than 5 mole percent, less than 1 mole percent, or less than 0.5 mole percent. In some embodiments, the reaction mixture used to form the polyamide is free or substantially free of the triamine. As used herein, the term "substantially free" in reference to the triamine means that the amount of the triamine is less than 0.5 mole percent (or less than 0.1 mole percent, or less than 0.05 mole percent) of the total primary and/or secondary amino groups in the reaction mixture.

The polyamides of the polyamide composition usually are terminated with amino groups. Amino group termination can be obtained by using the appropriate stoichiometric ratio of the diacids to the diamines during the synthesis of the polyamide. The mole ratio of diamine to diacid in the polyamide is typically at least 1:1 and is usually greater than 1:1, such at least 1.1:1, at least 1.2:1, at least 1.5:1 and up to 5:1, up to 4:1, up to 3:1, or up to 2:1. That is, the moles of diamine typically exceeds the moles of diacid; this favors the formation of terminal amino groups on the polyamide.

As discussed above, the polyamide composition may include a second polyamide composition. The second polyamide composition is different than the first polyamide composition and typically lacks tertiary amido groups along the polymeric backbone. It is to be appreciated that use of the second polyamide in the polyamide composition may be inadequate for enhancing the elongation at break of the curable compositions, while maintaining good adhesion to metallic substrates. Rather, it was discovered that polyamides having tertiary amides in the backbone provided these desired attributes.

In some embodiments, the second polyamide composition may include a multifunctional polyamidoamine or a hotmelt dimer acid based polyamide such as those described in U.S. Pat. No. 3,377,303 (Peerman et al.) and U.S. Pat. No. 2,705,223 (Renfrew et al.) that have secondary amido groups along the polymeric backbone. In some embodiments, the polyamides of the second polyamide composition may be liquid at room temperature (e.g., a viscous liquid of 500 to 50,000 cP). Suitable second polyamides are commercially available, for example, under the trade designation VERSAMID (e.g., VERSAMID 150 and VERSAMID 115) from Gabriel Chemicals, Akron, Ohio, USA. Both VERSAMID 150 and VERSAMID 115 are the reaction products of a dimer acid and a polyethylene polyamine such as those of formula $H_2N-(CH_2CH_2-NH)_w-CH_2CH_2-NH_2$, where w is an integer in a range of 1 to 30, in a range of 1 to 20, in a range of 1 to 10, or in a range of 1 to 5. VERSAMID 115 has a higher molecular weight than VERSAMID 150.

In other embodiments, the second polyamide is a polyamide that are suitable for hot melt processing such as those commercially available under the trade designation UNI-REZ (e.g., UNI-REZ 2651 and UNI-REZ 2671) from Arizona Chemical, Jacksonville, Fla., USA. These second polyamides can typically be dissolved in the first polyamide. If used, these hotmelt polyamides are used in an amount no greater than 5 weight percent (e.g., no greater than 3 weight percent, no greater than 2 weight percent, or no greater than 1 weight percent) based on the total weight of the polyamide composition.

The curable component typically contains 10 to 60 weight percent polyamide composition based on a total weight of the curable component (e.g., the total weight of the epoxy resin, polyamide composition, multifunctional amine compound, multifunctional (meth)acrylate compound, and optional catalyst). That is, the curable component contains at least 10 weight percent, at least 20 weight percent, at least 30 weight percent, at least 35 weight percent, at least 40 weight percent and up to 60 weight percent, up to 55 weight percent, up to 50 weight percent, up to 45 weight percent, or up to 40 weight percent of the polyamide composition. For example, the amount can be in a range of 10 to 50 weight percent, 10 to 40 weight percent, 10 to 30 weight percent, 20 to 60 weight percent, 20 to 50 weight percent, 20 to 40 weight percent, 30 to 60 weight percent, or 40 to 60 weight percent.

The polyamide composition contains the first polyamide and, optionally, the second polyamide. The polyamide composition can include one or more different first polyamides and can optionally include one or more different second polyamides. The first polyamide is present in an amount in a range of 20 to 100 weight percent based on a total weight of the polyamide composition. The amount of the first polyamide can be at least 30 weight percent, at least 40 weight percent, at least 50 weight percent, at least 60 weight percent, least 70 weight percent, at least 75 weight percent, at least 80 weight percent, at least 85 weight percent, at least 90 weight percent, or at least 95 weight percent and can be up to 100 weight percent, up to 98 weight percent, up to 95 weight percent, up to 90 weight percent, up to 85 weight percent, up to 80 weight percent, up to 75 weight percent, or up to 70 weight percent based on a total weight of the polyamide composition. The portion of the polyamide composition that is not the first polyamide composition is typically the second polyamide composition.

The polyamide composition often contains 20 to 100 weight percent of the first polyamide and 0 to 80 weight percent of the second polyamide based on a total weight of the polyamide composition. For example, the polyamide composition can contain 40 to 100 weight percent of the first polyamide and 0 to 60 weight percent of the second polyamide, 50 to 100 weight percent of the first polyamide and 0 to 50 weight percent of the second polyamide, 60 to 100 weight percent of the first polyamide and 0 to 40 weight percent of the second polyamide, 70 to 100 weight percent of the first polyamide and 0 to 30 weight percent of the second polyamide, 70 to 90 weight percent of the first polyamide and 10 to 30 weight percent of the second polyamide, 80 to 100 weight percent of the first polyamide and 0 to 20 weight percent of the second polyamide, 90 to 100 weight percent of the first polyamide and 0 to 10 weight percent of the second polyamide or 95 to 100 weight percent of the first polyamide and 0 to 5 weight percent of the second polyamide.

Multifunctional (Meth)acrylate Compounds

The curable compositions include one or more multifunctional (meth)acrylate compounds (e.g., monomers). The multifunctional (meth)acrylate compounds can facilitate a rapid increase in green strength during the early stage of curing of the curable composition. That is, the multifunctional (meth)acrylate reacts rapidly with the multifunctional amine compound and with primary amino groups on the polyamides within the polyamide composition by Michael addition. This reaction, which is faster than the reaction of the epoxy resin with the polyamides within the polyamide composition, results in the formation of crosslinks in the partially cured composition.

The multifunctional (meth)acrylates have multiple (meth) acryloyl groups and include di(meth)acrylates, tri(meth) acrylates, tetra(meth)acrylates, and penta(meth)acrylates. The multifunctional (meth)acrylates can be formed, for example, by reacting (meth)acrylic acid with a polyhydric alcohol (i.e., an alcohol having at least two hydroxyl groups) to form ester groups. The polyhydric alcohol may have two, three, four, or five hydroxyl groups.

In some embodiments, the multifunctional (meth)acrylate compounds may include at least two (meth)acryloyl groups. Exemplary multifunctional (meth)acrylates of this type may include, 1,2-ethanediol di(meth)acrylate, 1,3-propanediol di(meth)acrylate, 1,9-nonanediol di(meth)acrylate, 1,12-dodecanediol di(meth)acrylate, 1,4-butanediol di(meth)acrylate, 1,6-hexanediol di(meth)acrylate, bisphenol A di(meth) acrylate, diethylene glycol di(meth)acrylate, triethylene glycol di(meth)acrylate, tetraethylene glycol di(meth)acrylate, tripropylene glycol di(meth)acrylate, polyethylene glycol di(meth)acrylate, polypropylene glycol di(meth)acrylate, polyethylene/polypropylene copolymer di(meth) acrylate, polybutadiene di(meth)acrylate, tricyclodecane dimethanol di(meth)acrylate, propoxylated glycerin tri (meth)acrylate, and neopentylglycol hydroxypivalate di(meth)acrylate modified caprolactone. In some embodiments, the multifunctional acrylate components may include three or four (meth)acryloyl groups. Exemplary multifunctional acrylates of this type may include trimethylolpropane triacrylate (TMPTA) (e.g., commercially available under the trade designation TMPTA-N from Allnex USA Inc., Alpharetta, Ga. and under the trade designation SR351 from Sartomer and under the trade designation SR351-LV from Sartomer), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), ethoxylated (9) trimethylolpropane triacrylate (e.g., commercially available under the trade designation SR502 from Sartomer), a mixture of pentaerythritol triacrylate and pentaerythritol tetraacrylate (e.g., commercially available from Allnex under the trade designation PETIA), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). In some embodiments, the multifunctional acrylate components may include five (meth)acryloyl groups. Exemplary multifunctional acrylates of this type may include dipentaerythritol pentaacrylate (e.g., commercially available under the trade designation SR-399 from Sartomer).

The curable component typically includes 5 to 60 weight percent of the multifunctional (meth)acrylate compound based on a total weight of the curable component (e.g., the total weight of the epoxy resin, polyamide composition, multifunctional amine compound, multifunctional (meth)acrylate compound, and optional catalyst). The amount can be at least 5 weight percent, at least 10 weight percent, at least 15 weight percent, at least 20 weight percent, at least 25 weight percent, at least 30 weight percent and up to 60 weight percent, up to 55 weight percent, up to 50 weight percent, up to 45 weight percent, up to 40 weight percent, up to 35 weight percent, up to 30 weight percent, or up to 25 weight percent. For example, the amount can be in a range of 5 to 50 weight percent, 5 to 40 weight percent, 5 to 35 weight percent, 5 to 30 weight percent, 5 to 25 weight percent, 10 to 50 weight percent, 10 to 40 weight percent, 10 to 35 weight percent, 10 to 30 weight percent, or 10 to 25 weight percent.

It can be advantageous to have at least some of multifunctional (meth)acrylate compound included in the curable component, at least some of the multifunctional amine compound, or both contain at least three functional groups. This tends to enhance the green strength of the partially cured intermediate that forms early in the curing process. In some cases, 50 to 100 mole percent of the multifunctional (meth)acrylate compound included in the curable component has at least three (meth)acryloyl groups. The amount can be at least 60 mole percent, at least 70 mole percent, at least 80 mole percent, at least 90 mole percent, at least 95 mole percent, at least 98 mole percent, or 100 mole percent and can be up to 98 mole percent, up to 95 mole percent, up to 90 mole percent, up to 80 mole percent, or up to 70 mole percent. For example, the amount of the multifunctional (meth)acrylate compound included in the curable component that has at least three (meth)acryloyl groups is in a range of 60 to 100 mole percent, 70 to 100 mole percent, 80 to 100 mole percent, 90 to 100 mole percent, or 95 to 100 mole percent.

Multifunctional Amine Compounds

The curable compositions include one or more multifunctional amine compounds having at least two amino groups such as 2 to 6 amino groups. The amino groups may be primary amino and/or secondary amino groups. The multifunctional amine compounds may include aliphatic (including cycloaliphatic) or aromatic and usually does not contain amido groups.

The multifunctional amine compound usually contains 2 to 20 carbon atoms. That is, the multifunctional amine compound is typically not a polymeric material. There can be at least 2, at least 3, at least 4, at least 6, at least 10, at least 12 and up to 20, up to 18, up to 16, up to 12, or up to 10 carbon atoms in the multifunctional amine compound.

In many embodiments, the multifunctional amine compound has a molecular weight (e.g., number average molecular weight) in a range of 30 to 600 g/mol. The molecular weight is at least 30 g/mol, at least 40 g/mol, at least 60 g/mol, at least 80 g/mol, at least 100 g/mol, at least 150 g/mol, at least 200 g/mol, at least 250 g/mol, at least 300 g/mol, or at least 400 g/mol and up to at least 600 g/mol, up to 550 g/mol, up to 500 g/mol, up to 450 g/mol, up to 400 g/mole, up to 350 g/mole, or up to 300 g/mol. In illustrative embodiments, the diamines may include di-primary amines with an average molecular weight of 30 to 600 g/mol or 60 to 400 g/mol.

In some embodiments, the multifunctional amine compounds are alkylene diamines such as 1,3-diaminopropane, 1,6-hexamethylene diamine, ethylenediamine, 1,10-decamethylene diamine, 1,3-pentanediamine, and 2-methylpentamethylenediamine; aliphatic polyamines such as diethylene triamine, triethylenetriamine, tetraethylenepentamine, bis(hexamethylene)triamine, methylimino-bis (propyl) amine, polyoxyethylene diamines having no more than 20 carbon atoms, polyoxypropylene diamines having no more than 20 carbon atoms, 4,7,10-trioxa-1,13-tridecanediamine (TTD), and polyoxypropylene triamines having no more than 20 carbon atoms; cycloaliphatic diamines such as piperazine, 1-aminoethyl piperazine, 4-diaminocyclohexane, 1,3-diaminocyclohexane, 1,2-diaminocyclohexane, 4,4'-diamino dicyclohexylmethane, 2,4'-diamino dicyclohexylmethane, 2,2'-diamino dicyclohexylmethane, 3-aminomethyl-3,5,5-trimethylcyclohexylamine, 1,4-diaminomethylcyclohexane, and 1,3-diaminomethylcyclohexane, 3(4),8(9)-bis(aminomethyl)-tricyclo[5.2.1.0(2.6)]decane, and bicyclo[2.2.1]heptanebis(methylamine); and aralkyl diamines such as meta-xylene diamine.

The curable component typically includes 1 to 50 weight percent of the multifunctional amine compound based on a total weight of the curable component (e.g., the total weight of the epoxy resin, polyamide composition, multifunctional amine compound, multifunctional (meth)acrylate compound, and optional catalyst). The amount can be at least 1 weight percent, at least 2 weight percent, at least 3 weight percent, at least 5 weight percent, at least 10 weight percent, at least 15 weight percent, at least 20 weight percent, at least 25 weight percent, at least 30 weight percent and up to 50 weight percent, up to 45 weight percent, up to 40 weight percent, up to 35 weight percent, up to 30 weight percent, up to 25 weight percent, up to 20 weight percent, up to 15 weight percent, or up to 10 weight percent. For example, the amount can be in a range of 1 to 40 weight percent, 1 to 30 weight percent, 1 to 20 weight percent, 1 to 15 weight percent, 1 to 10 weight percent, 5 to 50 weight percent, 5 to 40 weight percent, 5 to 30 weight percent, 5 to 25 weight percent, 5 to 20 weight percent, 10 to 40 weight percent, 10 to 30 weight percent, 10 to 25 weight percent, or 10 to 20 weight percent.

The multifunctional amine compounds facilitate a rapid increase in green strength during the early stage of curing of the curable composition. That is, the multifunctional (meth)acrylate reacts rapidly with the multifunctional amine compound by a Michael addition. This results in the formation of crosslinks in the partially cured composition. The use of multifunctional amino compounds with at least three amino groups can result in enhanced green strength in the early stages of curing.

Catalysts

The curable compositions often include one or more catalysts, which are optional but usually preferred. Generally, the catalysts tend to accelerate the curing of the curable composition. Any suitable catalyst can be used but the catalyst is often a Lewis acid. Alternatively, or additionally, in some embodiments, the catalysts may include phosphoric acid or a combination of N-(3-aminopropyl) piperazine and salicylic acid that is synergistic for accelerating the cure of polyglycidyl ether of a polyhydric phenol cured with a poly(oxyalkylene) polyamine, which is discussed in U.S. Pat. No. 3,639,928 (Bentley et al.). Alternatively, or additionally, in some embodiments, the catalysts may include a basic catalyst such as 1,8-diazabicyclo[5.4.0]undec-7-ene (DBU).

Lewis acid catalysts may include metal salts, triorganoborates including trialkylborates (including those represented by the formula $B(OR^7)_3$, where each $R^7$ is independently an alkyl), and the like, and combinations thereof. Useful metal salts include those that contain at least one metal cation that acts as a Lewis acid. Suitable metal salts include metal salts of organic acids (e.g., metal carboxylates (including both aliphatic and aromatic carboxylates)), metal salts of a sulfonic acid (e.g., trifluoromethanesulfonic acid), metal salts of a mineral acid (e.g., nitric acid) and combinations thereof. Useful metal cations include those that have at least one vacant orbital. Suitable metals include calcium, zinc, iron, copper, bismuth, aluminum, magnesium, lanthanum, or combinations thereof. In some embodiments, the catalyst may include calcium triflate or calcium nitrate. For example, the catalyst is or includes calcium triflate.

The catalyst may be present in the curable component in an amount in a range of 0 to 10 weight percent or 0.1 to 10 weight percent based on a total weight of the curable component (e.g., the total weight of the epoxy resin, polyamide composition, multifunctional amine compound, multifunctional (meth)acrylate compound, and catalyst). If used, the amount of the catalyst is often at least 0.1 weight percent, at least 0.2 weight percent, at least 0.5 weight percent, at least 1 weight percent, at least 2 weight percent, at least 3 weight percent, or at least 5 weight percent and can be up to 10 weight percent, up to 8 weight percent, up to 6 weight percent, or up to 5 weight percent. For example, the amount can be in a range of 0.5 to 10 weight percent, 0.5 to 8 weight percent, 0.5 to 6 weight percent, 0.5 to 5 weight percent, 0.5 to 3 weight percent, 1 to 10 weight percent, 1 to 8 weight percent, 1 to 6 weight percent, 1 to 5 weight percent, or 1 to 3 weight percent.

Optional Toughening Agents

In addition to the polyamides that may be considered to function as a toughening agent, the curable component may also include one or more optional toughening agents. Such toughening agents may be useful, for example, for improving the properties (e.g., peel strength) of some cured compositions so that they are less likely to undergo brittle failure in a fracture. The toughening agent (e.g., an elastomeric resin or elastomeric filler) may or may not be covalently bonded within the final crosslinked network of the cured composition. In some embodiments, the toughening agent may include an epoxy-terminated compound, which can be incorporated into the polymeric backbone.

Examples of useful toughening agents, which may also be referred to as elastomeric modifiers, include polymeric compounds having both a rubbery phase and a thermoplastic phase such as graft copolymers having a polymerized diene rubbery core and a polyacrylate or polymethacrylate shell; graft copolymers having a rubbery core with a polyacrylate or polymethacrylate shell; elastomeric particles polymerized in situ in the epoxide from free-radical polymerizable monomers and a copolymeric stabilizer; elastomer molecules such as polyurethanes and thermoplastic elastomers; separate elastomer precursor molecules; combination molecules that include epoxy-resin segments and elastomeric segments; and, mixtures of such separate and combination molecules. The combination molecules may be prepared by reacting epoxy resin materials with elastomeric segments; the reaction can leave reactive functional groups, such as unreacted epoxy groups, on the reaction product. The use of toughening agents in epoxy resins is described in the *Advances in Chemistry Series No.* 208 entitled "Rubbery-Modified Thermoset Resins", edited by C. K. Riew and J. K. Gillham, American Chemical Society, Washington, 1984. The amount of toughening agent to be used depends, in part, upon the final physical characteristics of the cured resin desired.

The optional toughening agents included in the curable component often contain graft copolymers having a polymerized diene rubbery backbone or core to which is grafted a shell of an acrylic acid ester or methacrylic acid ester, mono-vinyl aromatic hydrocarbon, or a mixture thereof, such as those disclosed in U.S. Pat. No. 3,496,250 (Czerwinski). Rubbery backbones can comprise polymerized butadiene or a polymerized mixture of butadiene and styrene. Shells comprising polymerized methacrylic acid esters can be lower alkyl ($C_{1-4}$) methacrylates. Monovinyl aromatic hydrocarbons can be styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature ($T_g$) below about 0° C., such as poly(butyl acrylate) or poly(isooctyl acrylate), to which is grafted a polymethacrylate polymer shell having a $T_g$ about 25° C. such as poly (methyl methacrylate). For acrylic core/shell materials, the term "core" will be understood to be an acrylic polymer having $T_g$ less than 0° C. and the term "shell" will be understood to be an acrylic polymer having $T_g$ greater than 25° C. Some core/shell toughening agents (e.g., including acrylic core/shell materials and methacrylate-butadiene-styrene (MBS) copolymers wherein the core is crosslinked styrene/butadiene rubber and the shell is polymethylacrylate) are commercially available, for example, from Dow Chemical Company under the trade designation "PARALOID".

Another useful core-shell rubber is described in U.S. Pat. Appl. Publ. No. 2007/0027233 (Yamaguchi et al.). Core-shell rubber particles as described in this document include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber can be dispersed in a polymer or an epoxy resin. Examples of useful core-shell rubbers include those sold by Kaneka Corporation under the designation Kaneka KANE ACE, including the Kaneka KANE ACE 15 and 120 series of products (e.g., KANE ACE MX 153, KANE ACE MX 154, KANE ACE MX 156, KANE ACE MX 257, and KANE ACE MX 120) core-shell rubber dispersions, and mixtures thereof. The products contain the core-shell rubber (CSR) particles pre-dispersed in an epoxy resin, at various concentrations. For example, KANE ACE MX 153 core-shell rubber dispersion contains 33 weight percent CSR, KANE ACE MX 154 core-shell rubber dispersion contains 40 weight percent CSR, and KANE ACE MX 156 core-shell rubber dispersions contains 25 weight percent CSR.

Other useful toughening agents include carboxyl- and amine-terminated acrylonitrile/butadiene elastomers such as those obtained from Emerald Performance Materials, Akron, Ohio, USA, under the trade designation "HYPRO" (e.g., CTB and ATBN grades such as HYPROP 1300X42 ATBN); carboxyl- and amine-terminated butadiene polymers such as those obtained from Emerald Performance Materials under the trade designation "HYPRO" (e.g., CTB grade); amine-functional polyethers such as any of those described above; and amine-functional polyurethanes such as those described in U.S. Pat. Appl. No. 2013/0037213 (Frick et al.). These polymers have more than 20 carbon atoms and are not considered to be multifunctional amine compounds as defined herein.

Still other useful toughening agents are phenalkamines with more than 20 carbon atoms such as, for example, phenalkamines commercially available under the trade designation CARDOLITE (e.g., CARDOLITE NC-540). CARDOLITE NC-540 is a product of a Mannich reaction of cashew nutshell liquid, formaldehyde, and certain amines. The cashew nutshell liquid contains cardanol, a phenolic material having an attached $C_{15}H_{27}$ group.

In some embodiments, the toughening agent may include an acrylic core/shell polymer; a styrene-butadiene/methacrylate core/shell polymer; a polyether polymer; a carboxyl- or amino-terminated acrylonitrile/butadiene; a carboxylated butadiene, a polyurethane, or a combination thereof.

Toughening agents (excluding polyamides) may be present in the curable component (e.g., the total weight of the epoxy resin, polyamide composition, multifunctional amine compound, multifunctional (meth)acrylate compound, and optional catalyst) in an amount ranging from 0 to 10 weight percent based on a total weight of the curable component. The amount can be at least 0.1 weight percent, at least 0.5 weight percent, at least 1 weight percent, at least 2 weight percent, at least 3 weight percent and up to 10 weight percent, up to 8 weight percent, up to 6 weight percent, up to 5 weight percent, or up to 2 weight percent. For example, the amount can be in a range of 0 to 10 weight percent, 0 to 5 weight percent, or 0 to 2 weight percent.

Other Optional Additives

In some embodiments, the curable component may include dispersants that can help stabilize any optional inorganic filler that is in the curable composition. That is, without dispersant, the particles may aggregate, thus adversely affecting the benefit of the organic filler in the cured composition. Suitable dispersants may depend on the specific identity and surface chemistry of the inorganic filler. In some embodiments, suitable dispersants may include at least a binding group and a compatibilizing segment. The binding group may be ionically bonded to the surface of the inorganic filler. Examples of binding groups for alumina particles include phosphoric acid, phosphonic acid, sulfonic acid, carboxylic acid, and amine. The compatibilizing segment may be selected to be miscible with the curable components. For epoxy resin and polyamide matrices, useful compatibilizing agents may include polyalkylene oxides (e.g., polypropylene oxide, polyethylene oxide), polycaprolactones, and combinations thereof. Commercially available examples include BYK W-9010 (BYK Additives and Instruments), BYK W-9012 (BYK Additives and Instruments), DISBERBYK 180 (BYK Additives and Instruments), and SOLPLUS D510 (Lubrizol Corporation). In some embodiments, the dispersants may be present in the curable component in an amount between 0 to 10 weight percent based on a total weight of the curable component. The amount can be at least 0.1 weight percent, at least 0.2 weight percent, at least 0.5 weight percent, at least 1 weight percent, at least 2 weight percent, at least 5 weight percent and up to 10 weight percent, up to 8 weight percent, up to 5 weight percent, or up to 3 weight percent.

In some embodiments, the dispersant may be pre-mixed with the inorganic filler prior to combining the inorganic filler with the curable components. Such pre-mixing may facilitate the filled systems behaving like Newtonian fluids or enabling shear-thinning effects behavior.

Further additives can be included in the curable component. For example, additives such as antioxidants/stabilizers, colorants, thermal degradation stabilizers, light stabilizers, tackifiers, flow agents, bodying agents, flatting agents, blowing agents, fungicides, bactericides, surfactants, plasticizers, organic fillers (e.g., carbon black) and other additives known to those skilled in the art can be added. These additives, if present, are added in an amount effective for their intended purpose. The total amount of such additives is typically less than 20 weight percent, less than 10 weight percent, less than 5 weight percent, or less than 1 weight percent of the curable component.

Curable Component

The curable component includes all materials in the curable composition except the optional inorganic filler. That is, the curable component includes the epoxy resin, polyamide composition, multifunctional amine compound, multifunctional (meth)acrylate compound, optional catalyst, optional toughening agent, and any other optional components such as antioxidants and the like.

The epoxy resin, multifunctional (meth)acrylate compound, multifunctional amine and polyamide compositions are typically present in the curable component based on stoichiometric ratios of the various reactive functional groups. The moles of reactive hydrogens on amino groups (i.e., —N—H groups that can originate from the polyamide composition, the multifunctional amine compound, and from any optional toughening agent with amino groups) are typically present in an amount equal to or greater than the combined moles of epoxide groups from the epoxy resin and moles of (meth)acryloyl groups from the multifunctional (meth)acrylate compound. That is, the ratio of the moles of amine hydrogen (from the polyamide composition, the multifunctional amine compound, and optionally the toughening agent) to combined moles of epoxide groups and (meth)acryloyl groups is often at least 1:1 and can be up to 1.02:1, up to 1.1:1, up to 1.2:1, up to 1.5:1, up to 1.8:1, or up to 2:1. Using a ratio greater than 1:1 may be advantageous in minimizing the amount of residual unreacted epoxy resin in the cured composition. In some situations, unreacted epoxy resin may migrate to the surface of the cured composition and/or may further increase the crosslinking density over time.

Typically, the curable component typically contains 5 to 50 weight percent epoxy resin, 10 to 60 weight percent polyamide composition, 5 to 60 weight percent multifunctional (meth)acrylate compound, 1 to 50 weight percent multifunctional amine compound, 0.1 to 10 weight percent catalyst, and 0 to 10 weight percent optional organic toughening agent. The amounts are based on a total weight of the curable component.

In some examples, the curable component contains 5 to 35 weight percent epoxy resin, 20 to 60 weight percent polyamide composition, 10 to 50 weight percent multifunctional (meth)acrylate compound, 1 to 30 weight percent multifunctional amine compound, 0.5 to 5 weight percent catalyst, and 0 to 5 weight percent optional organic toughening agent. The amounts are based on a total weight of the curable component.

In other examples, the curable component contains 10 to 25 weight percent epoxy resin, 30 to 55 weight percent polyamide composition, 15 to 35 weight percent multifunctional (meth)acrylate compound, 5 to 20 weight percent multifunctional amine compound, 1 to 5 weight percent catalyst, and 0 to 3 weight percent optional organic toughening agent. The amounts are based on a total weight of the curable component.

Optional Inorganic Fillers

The curable compositions may include one or more optional inorganic fillers and the amount is less than 25 weight percent based on the total weight of the curable composition. The curable composition includes the curable component plus any optional inorganic filler. The curable composition can contain up to 20 weight percent, up to 15 weight percent, up to 10 weight percent, up to 5 weight percent, up to 3 weight percent, up to 2 weight percent, or up to 1 weight percent inorganic filler. In some embodiments, the curable composition is free of inorganic filler. The amount of the optional inorganic filler can be in a range of 0 to less than 25 weight percent, 0 to 20 weight percent, 0 to 10 weight percent, 0 to 5 weight percent, 0 to 3 weight percent, or 0 to 1 weight percent.

Generally, any known inorganic fillers may be used. The inorganic fillers can be added to provide various properties to the final cured composition, to alter the appearance of the final cured compositions, or to alter the flow properties of the curable composition. The inorganic fillers can be metal oxides, metal hydroxides, metal oxyhydroxides, metal silicates, metal borides, metal carbides, metal nitrides, and the like. Some inorganic fillers are ceramic materials such as, for example, silicon oxide (e.g., fused or fumed silica), aluminum oxide (e.g., alumina), aluminum trihydroxide (ATH), boron nitride, silicon carbide, beryllium oxide, marble powder, chalk, sand, mica powder, slate powder, zircon, or glass. Some organic filler are metals such as copper, aluminum, nickel, chromium, or steel.

The inorganic filler can have any desired form such as particles or fibers. The particles can be spherical, plate-like, acicular, or irregular. The inorganic filler can have any desired dimension.

To facilitate dispersion and increase inorganic filler loading, in some embodiments, the inorganic fillers may be surface-treated or coated. Generally, any known surface treatments and coatings may be suitable, including those based on silane, titanate, zirconate, aluminate, and organic acid chemistries. In some embodiments, the inorganic filler can be particles that are surface modified with an organic silane. For powder handling purposes, many fillers are available as polycrystalline agglomerates or aggregates with or without binder. In some embodiments, the inorganic fillers may include mixtures of particles and agglomerates of various size and mixtures.

Curable Composition

The curable composition contains both the curable component and the optional inorganic filler. The curable component contains the epoxy resin, polyamide composition, multifunctional (meth)acrylate compound, multifunctional amine compound, optional catalyst, and various other optional additives such as an toughening agents, dispersants, antioxidants/stabilizers, colorants, thermal degradation stabilizers, light stabilizers, tackifiers, flow agents, bodying agents, flatting agents, blowing agents, fungicides, bactericides, surfactants, plasticizers, and the like known to those of skill in the art.

The curable composition contains greater than 75 to 100 weight percent curable component and 0 to less than 25 weight percent inorganic filler. For example, the curable composition can contain 80 to 100 weight percent curable component and 0 to 20 weight percent inorganic filler, 85 to 100 weight percent curable component and 0 to 15 weight percent inorganic filler, 90 to 100 weight percent curable component and 0 to 10 weight percent inorganic filler, 95 to 100 weight percent curable component and 0 to 5 weight percent inorganic filler, 98 to 100 weight percent curable component and 0 to 2 weight percent inorganic filler, 99 to 100 weight percent curable component and 0 to 1 weight percent inorganic filler, or 100 weight percent curable component.

The curable composition can be a one-part composition or a two-part composition. If the curable composition is not intended to be used immediately after preparation, the curable composition is typically prepared as a multi-part (e.g., two-part) composition. The materials in each part are selected so that no curing reactions occur within that part.

In some embodiments, a first part includes the epoxy resin and the multifunctional (meth)acrylate and a second part contains the polyamide composition and the multifunctional amine compound. Other materials, if present, such as catalysts, toughening agents, inorganic fillers, dispersants, and other optional additives can be present in either part or both parts provided these materials do not react with other materials in that part. If the toughening agent has amino groups, it is typically present in the second part.

A dispenser is provided that contains at least two chambers. The first chamber contains the first part and the second chamber contains the second part. If desired, the various materials in the curable composition can be divided into more than two parts and the dispenser can have more than two chambers.

In some embodiments, the curable compositions may be prepared by mixing the epoxy resin and the multifunctional (meth)acrylate compound and, separately, mixing the polyamide composition and the multifunctional amine compound. Both parts may be mixed using any conventional mixing technique, including using a high shear mixer. In embodiments in which inorganic fillers are included in the curable compositions, any optional dispersants are usually pre-mixed with the inorganic filler prior to incorporating into the composition. Next, the two parts may be mixed using any conventional mixing technique to form the curable composition.

Cured Composition

The cured composition is the reaction product of the curable composition. In some embodiments, the curable compositions may be capable of curing without the use of catalyst or curing accelerator is used. In other embodiments, a catalyst or curing accelerator is added. The curable composition can be cured at room temperature or elevated temperatures (e.g., greater than 30° C.). For example, the curable compositions may cure at typical application conditions, such as at room temperature without the need for elevated temperatures or actinic radiation (e.g., ultraviolet light). For example, the curable composition cures at room temperature, or at temperatures no greater than 30° C., such as no greater than 25° C. or even no greater than 20° C. If desired, an optional post-curing step at an elevated temperature can be used after curing at room temperature.

In some embodiments, the time to cure is no greater than 60 minutes, such as no greater than 40 minutes, no greater than 30 minutes, or even no greater than 20 minutes. Although very rapid cure (e.g., less than 5 minutes or even less than 1 minute) may be suitable for some applications, in other embodiments, an open time of at least 5 minutes (e.g., at least 10 minutes, or even at least 15 minutes) may be desirable to allow time for positioning and repositioning of the substrates.

The curable composition can be provided as a two-part composition. The two parts may be mixed prior to being applied to a substrate. Applying the curable composition can be carried out, for example, by dispensing the curable composition from a dispenser comprising a first chamber, a second chamber, and a mixing tip. The first chamber comprises the first part, the second chamber comprises the second part, and the first and second chambers are coupled to the mixing tip to allow the first part and the second part to flow through the mixing tip. After mixing, the two-part composition undergoes a curing reaction to reach a desired handling strength (green strength), and ultimately to achieve a desired final strength.

Upon curing, the cured compositions may exhibit thermal, mechanical, and rheological properties that render the compositions particularly useful as, for example, structural adhesives, semi-structural adhesives, or protective coatings. During the curing process, an intermediate with good green strength properties can form.

The cured compositions often have an elongation at break after curing for 24 hours at room temperature that is in a range of 40 to 150 percent. After curing at 120° C. for 1 hour, the elongation at break is often in a range of 30 to 150 percent. The elongation at break values are measured in accordance with ASTM D638-14, "Standard Test Method for Tensile Properties of Plastics." with a pulling rate of 0.04 inches/minute (1 mm/minute).

The cured compositions often have an overlap shear green strength (measured after curing for 30 minutes at room temperature) in a range of 0.1 to 1.1 MPa. The overlap shear strength after curing for 24 hours at room temperature is often in a range of 1 to 10 MPa. After curing at 120° C. for 1 hour, the overlap shear strength is often in a range of 2 to 20 MPa. The overlap sheer strength values are measured on untreated aluminum substrates (i.e., aluminum substrates having no surface treatments or coatings other than native oxide layers) in accordance with ASTM D1002-01, "Standard Test Method for Apparent Shear Strength of Single-Lap-Joint Adhesively Bonded Metal Specimens by Tension Loading (Metal-to-Metal)." The crosshead speed is 0.05 inch/minute (1.27 mm/minute).

The cured compositions often have a tensile strength in a range of 1 to 10 MPa after curing for 24 hours at room temperature and in a range of 0.8 to 15 MPa after curing for 1 hour at 120° C. Tensile strength is measured according to ASTM D638-14, "Standard Test Method for Tensile Properties of Plastics." The crosshead speed is 0.04 inch/minute (1 mm/minute).

The cured compositions often have a modulus in a range of 1.5 to 200 MPa after curing for 24 hours at room temperature and in a range of 2 to 300 MPa after curing for 1 hour at 120° C. Modulus is measured according to ASTM D638-14, "Standard Test Method for Tensile Properties of Plastics." The crosshead speed is 0.04 inch/minute (1 mm/minute).

In some embodiments, within 10 minutes of combining the components of the curable composition, the viscosity of curable/partially cured composition measured at room temperature may range of 100 to 1,000,000 poise. The viscosity of the epoxy composition (prior to mixing) measured at room temperature may range of 10 to 100,000 poise, and at 60° C. may range of 1 to 10,000 poise; and the viscosity of the polyamide composition (prior to mixing) measured at room temperature may be in a range of 100 to 100,000 poise, and at 60° C. may be in a range of 10 to 10,000 poise (for purposes of the present application, viscosity values are as measured using a 40 mm parallel-plate geometry at 1% strain on a ARES Rheometer (TA Instruments, Wood Dale, Ill., US) equipped with a forced convection oven accessory, at angular frequencies ranging from 10-500 rad/s).

The curable compositions may be useful for coatings, shaped articles, adhesives (including structural and semi-structural adhesives), filled or reinforced composites, caulking and sealing compositions, casting and molding compositions, potting and encapsulating compositions, impregnating and coating compositions, protective coatings for electronics, primers or adhesion-promoting layers, and in other applications that are known to those skilled in the art. In some embodiments, articles comprising a substrate (e.g., a metal substrate) and having a cured layer of the curable composition thereon are provided.

In some embodiments, the cured composition may function as a structural or semi-structural adhesive (i.e., the cured composition can bond a first substrate to a second substrate) after curing. Generally, the bond strength (e.g., peel strength, overlap shear strength, or impact strength) of a structural or semi-structural adhesive continues to build well after the initial cure time. Thus, an article is provided that comprises a first substrate, a second substrate and a cured composition disposed between and adhering (bonding) the first substrate to the second substrate, wherein the cured composition is the reaction product of the curable composition described above. In some embodiments, the first and/or second substrate may be at least one of a metal, a ceramic and a polymeric material.

In other embodiments, the curable and cured composition may function as a coating. Thus, an article is provided that comprises a substrate (e.g., metal substrate) and a coating of the uncured, partially cured or fully cured curable composition on at least one surface thereof. If the substrate has two major surfaces, the coating can be coated on one or both major surfaces of the substrate. Other layers can be present such as, for example, bonding, tying, protective, and topcoat layers. The substrate is often a metal and the metal substrate can be, for example, at least one of the inner and outer surfaces of a pipe, vessel, conduit, rod, profile shaped article, sheet or tube.

The curable compositions may be coated onto substrates at useful thicknesses ranging from 5 microns to 10,000 microns, 25 micrometers to 10,000 micrometers, 100 micrometers to 5,000 micrometers, or 250 micrometers to 1,000 micrometers. Useful substrates can be of any nature and composition, and can be inorganic or organic. Representative examples of useful substrates include ceramics, siliceous substrates including glass, metal (e.g., aluminum, copper, nickel, iron, or steel), natural and man-made stone, woven and nonwoven articles, polymeric materials including thermoplastics and thermosets, (such as polymethyl (meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), wood, and composites of the foregoing materials.

Various embodiments are provided that include a curable composition, a cured composition, and an article containing the cured composition.

Embodiment 1A is a curable composition that includes contains a curable component and an optional inorganic filler. The curable component contains an epoxy resin, a polyamide composition, a multifunctional amine compound having 2 to 20 carbon atoms, and a multifunctional (meth)acrylate compound. The polyamide composition contains a first polyamide having a tertiary amide in a polymeric backbone thereof and having at least 2 terminal amino groups. The curable composition contains 0 to less than 25 weight percent of the optional inorganic filler based on a total weight of the curable composition.

Embodiment 2A is the curable composition of embodiment 1A, wherein the curable component comprises 5 to 50 weight percent epoxy resin based on a total weight of the curable component.

Embodiment 3A is the curable composition of embodiment 1A or 2A, wherein the curable component comprises 10 to 60 weight percent polyamide composition based on a total weight of the curable component.

Embodiment 4A is the curable composition of any one of embodiments 1A to 3A, wherein the polyamide composition comprises 20 to 100 weight percent first polyamide based on a total weight of the polyamide composition.

Embodiment 5A is the curable composition of any one of embodiments 1A to 4A, wherein 30 to 100 mole percent of the amido groups in the first polyamide are tertiary amido groups.

Embodiment 6A is the curable composition of any one of embodiments 1A to 5A, wherein 50 to 100 mole percent or 70 to 100 mole percent of the amido groups in the first polyamide are tertiary amido groups.

Embodiment 7A is the curable composition of any one of embodiments 1A to 6A, wherein the first polyamide comprises a reaction product of 1) a dimer acid and 2) a secondary diamine and/or a secondary/primary hybrid diamine.

Embodiment 8A is the curable composition of any one of embodiments 1A to 7A, wherein the polyamide composition further comprises a second polyamide having 0 to less than 30 mole percent tertiary amido groups based on total content of amido groups in the polymeric backbone thereof and having terminal amino groups.

Embodiment 9A is the curable composition of embodiment 8A, wherein the polyamide composition comprises 20 to 100 weight percent of the first polyamide and 0 to 80 weight percent of the second polyamide based on a total weight of the polyamide composition.

Embodiment 10A is the curable composition of any one of embodiments 1A to 9A, wherein the curable component comprises 5 to 60 weight percent of the multifunctional (meth)acrylate compound based on a total weight of the curable component.

Embodiment 11A is the curable composition of any one of embodiments 1A to 10A, wherein the curable component comprises at least one multifunctional (meth)acrylate compound having at least three (meth)acryloyl groups.

Embodiment 12A is the curable composition of any one of embodiments 1A to 11A, wherein the curable component comprises 1 to 50 weight percent multifunctional amine compound.

Embodiment 13A is the curable composition of any one of embodiments 1A to 12A, wherein the curable component further comprises a catalyst comprising a Lewis acid.

Embodiment 14A is the curable composition of embodiment 13A, wherein the curable component comprises 0.1 to 10 weight percent catalyst based on a total weight of the curable component.

Embodiment 15A is the curable composition of any one of embodiments 1A to 14A, wherein the curable composition comprises 0 to 10 weight percent inorganic filler.

Embodiment 16A is the curable composition of any one of embodiments 1A to 15A, wherein the curable component further comprises a toughening agent.

Embodiment 17A is the curable composition of embodiment 16A, wherein the curable component comprises 0 to 10 weight percent toughening agent based on a total weight of the curable component.

Embodiment 18A is the curable composition of any one of embodiments 1A to 17A, wherein the curable component comprises 5 to 50 weight percent epoxy resin, 10 to 60 weight percent polyamide composition, 5 to 60 weight percent multifunctional (meth)acrylate compound, 1 to 50 weight percent multifunctional amine compound, 0.1 to 10 weight percent catalyst, and 0 to 10 weight percent optional organic toughening agent based on a total weight of the curable component.

Embodiment 19A is the curable composition of any one of embodiments 1A to 18A, wherein the curable component comprises 5 to 35 weight percent epoxy resin, 20 to 60 weight percent polyamide composition, 10 to 50 weight percent multifunctional (meth)acrylate compound, 1 to 30 weight percent multifunctional amine compound, 0.5 to 5 weight percent catalyst, and 0 to 5 weight percent optional organic toughening agent based on a total weight of the curable component.

Embodiment 20A is the curable composition of any one of embodiments 1A to 19A, wherein the curable component comprises 10 to 25 weight percent epoxy resin, 30 to 55 weight percent polyamide composition, 15 to 35 weight percent multifunctional (meth)acrylate compound, 5 to 20 weight percent multifunctional amine compound, 1 to 5 weight percent catalyst, and 0 to 3 weight percent optional organic toughening agent based on a total weight of the curable component.

Embodiment 21A is the curable composition of any one of embodiments 1A to 20A, wherein the curable composition comprises 90 to 100 weight percent curable component and 0 to 10 weight percent optional inorganic filler based on a total weight of the curable composition.

Embodiment 1B is a cured composition comprising a reaction product of the curable composition of embodiment 1A.

Embodiment 2B is the cured composition of embodiment 1B, wherein the curable composition is any one of embodiments 2A to 21A.

Embodiment 1C is an article comprising a first substrate and a cured composition adjacent to the first substrate, wherein the cured composition comprises a reaction product of the curable composition of embodiment 1A.

Embodiment 2C is the article of embodiment 1C, wherein the cured composition comprises a reaction product of the curable composition of any one of embodiments 2A to 21A.

Embodiment 3C is the article of embodiment 1C or 2C, wherein the article further comprises a second substrate and the curable composition is positioned between the first substrate and the second substrate, the cured composition bonding the first substrate to the second substrate.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Mo., USA, or may be synthesized by known methods. Table 1 (below) lists materials used in the examples and their sources.

TABLE 1

Materials List

| DESIGNATION | DESCRIPTION | PURPOSE | SOURCE |
|---|---|---|---|
| Polyamide 1 | Liquid polyamide prepared as described below from dimer acid, ethylene diamine and piperazine | First Polyamide | Synthesis procedure provided below |
| Polyamide 2 | Liquid polyamide prepared as described below from dimer acid, ethylene diamine and piperazine | First Polyamide | Synthesis procedure provided below |
| Polyamide 3 | Liquid polyamide prepared as described below from dimer acid, ethylene diamine and piperazine | First Polyamide | Synthesis procedure provided below |
| Polyamide 4 | Obtained under the trade designation VERSAMIDE 150 | Second Polyamide | Gabriel Chemicals, Akron, OH, USA |
| Amine 1 | 2-methylpentamethylene diamine that was obtained under the trade designation DYTEK A | Multifunctional amine compound | TCI America, Portland, OR, USA |
| Amine 2 | 4,7,10-trioxa-1,13-tridecanediamine (TTD) | Multifunctional amine compound | Sigma-Aldrich, St. Louis, MO, USA |
| Amine 3 | m-xylenediamine (mXDA) | Multifunctional amine compound | Acros Organics, Morris, NJ, USA |
| Toughening Agent 1 | Amine terminated butadiene-acrylonitrile copolymer obtained under the trade designation HYPRO 1300X42 ATBN | Toughening agent | Emerald Performance Chemicals, Akron, OH, USA |
| Toughening Agent 2 | A phenalkamine obtained under the trade designation CARDOLITE NC-540 that is based on cashew nut shell oil | Toughening agent | Cardolite Corporation, Monmouth Junction, NJ, USA |
| Accelerator 1 | Calcium nitrate tetrahydrate | Catalyst | Sigma-Aldrich, St. Louis, MO, USA |
| Accelerator 2 | Calcium triflate | Catalyst | Sigma-Aldrich |
| Accelerator 3 | 1,8-Diazabicyclo[5.4.0]undec-7-ene (DBU) | Catalyst | Sigma-Aldrich, St. Louis, MO, USA |
| Epoxy 1 | Obtained under the trade designation EPON 828 | Epoxy resin | Hexion, Columbus, OH, USA |
| Acrylate 1 | Trimethylolpropane triacrylate (TMPTA) obtained under the trade designation SR351-LV | Multifunctional (meth)acrylate compound | Sartomer, Exton, PA, USA |
| Acrylate 2 | Tricyclodecane dimethanol diacrylate obtained under the trade designation SR833S | Multifunctional (meth)acrylate compound | Sartomer, Exton, PA, USA |
| Acrylate 3 | Ethoxylated (9) trimethylolpropane triacrylate obtained under the trade designation SR502 | Multifunctional (meth)acrylate compound | Sartomer, Exton, PA, USA |
| Filler 1 | Carbon black | Organic Filler | Cabot, Boston, MA, USA |

Test Procedures

Overlap Shear Adhesion (OLS)

Two 0.5 inch (1.27 centimeters (cm)) wide×4 inch (10 cm) long×0.125 inch (0.32 cm) thick aluminum coupons were cleaned using methyl ethyl ketone (MEK) and otherwise left untreated. At the tip of one coupon, a 0.5 inch by 0.5 inch (1.27 cm×1.27 cm) square was covered by the mixed polyamide/epoxy paste and then laminated with another coupon in the opposite tip direction to give about 10 to 30 mils (0.25 to 0.76 millimeters (mm)) of paste between the aluminum coupons, which was clamped by a binder clip. The laminated aluminum coupons were then cured at one of the following sets of conditions: room temperature for 24 hours, 100° C. for 1 hour, and 120° C. for 1 hour, to give complete curing. The sample was then conditioned at room temperature for 30 minutes prior to overlap shear testing.

OLS tests were conducted on an Instron Universal Testing Machine model 1122 (Instron Corporation, Norwood, Mass., USA) according to the procedures of ASTM D1002-01, "Standard Test Method for Apparent Shear Strength of Single-Lap-Joint Adhesively Bonded Metal Specimens by Tension Loading (Metal-to-Metal)." The crosshead speed was 0.05 inch/minute (1.27 mm/minute). If the OLS is lower than 0.01 MPa, we mark it as "not measurable".

Tensile Properties

For tensile strength tests, dog bone-shaped samples were made in accordance with ASTM D1708-13 by pressing the mixed paste into a dog bone-shaped silicone rubber mold, which was then laminated with release liner on both sides. The dog bone shape gives a sample with a length of about 0.6 inch in the center straight area, a width of about 0.2 inch in the narrowest area, and a thickness of about 0.06 to about 0.1 inch. Samples were then cured at room temperature for 24 hours, 100° C. for 1 hour, or 120° C. for 1 hour to be fully cured prior to tensile testing. The sample was then conditioned at room temperature for 30 minutes prior to overlap shear testing.

Tensile strength tests were conducted on an Instron Universal Testing Machine model 1122 (Instron Corporation, Norwood, Mass., US) according to ASTM D638-14, "Standard Test Method for Tensile Properties of Plastics." The crosshead speed was 0.04 inch/minute (1 mm/minute).

Modulus was calculated from the slope of the linear portion of the stress-strain curve.

Synthesis of Liquid Polyamide (Polyamide 1 to 3)

A list of reagents used in the synthesis of Polyamides 1, 2, and 3 provided in Table 2 and the synthesis formulation and conditions are summarized in Table 3.

TABLE 2

Materials used for synthesis of Liquid Polyamides

| DESIGNATION | DESCRIPTION | SOURCE |
|---|---|---|
| Diacid | Dimer acid, long chain diacid (equivalent weight 287.7 grams/equivalent); obtained under the trade designation PRIPOL 1013 | Croda, New Castle, DE, USA |
| Diamine 1 | Ethylenediamine, ≥99 percent pure | Alfa Aesar, Haverhill, MA, USA |
| Diamine 2 | Piperazine, solvent grade: REAGENTPLUS, ≥99 percent pure | Sigma-Aldrich, St. Louis, MO, USA |
| Catalyst | 85% Phosphoric Acid | J. T. Baker, Center Valley, PA, USA |

TABLE 3

Formulation for synthesis of Polyamides 1, 2, and 3

|  | SYNTHESIS TEMP, °C. | Vacuum | DIACID PRIPOL 1013 | DIAMINE Ethylene diamine | Piperazine | CATALYST 85% Phosphoric Acid, ppm |
|---|---|---|---|---|---|---|
| Polyamide 1 | 225° C. | Full vacuum | 100 mol % | 5 mol % | 95 mol % | 300 ppm |
| Polyamide 2 | 200° C. | No vacuum | 100 mol % | 5 mol % | 95 mol % | 300 ppm |
| Polyamide 3 | 200° C. | No vacuum | 100 mol % | 5 mol % | 95 mol % | 300 ppm |

The synthesis of liquid polyamides was conducted in a 1 liter (L) reactor. Isopropanol (IPA) was used to clean the kettle before charging the raw material followed by drying the chamber with heat under vacuum. The target batch temperature was set to 150° C. Once the batch temperature reached 150° C., the batch temperature set-point was increased to 177-182° C. to let the vapor reach overhead. When the vapor reached the overhead, the overhead temperature gradually increased to 100° C. Approximately 80 to about 90% of the theoretical amount of water was collected from the distillation. For Polyamide 1, after the overhead temperature decreased, and after another 5 minutes, the target batch temperature was set to 225° C. The overhead temperature gradually increased and then decreased again. After 5 minutes, full vacuum (1~2 torr) was pulled in the chamber. The torque gradually increased and levelled off. When the torque levelled, the chamber was vented to atmosphere pressure. About 10 pounds (lbs.) of resin was drained into an aluminum pan covered with release liner. For polyamide 2 and 3, after the overhead temperature decreased, and after another 5 minutes, the target batch temperature was set to 200° C., and was stirred for 1.5 hours. About 10 pounds of resin was drained into an aluminum pan covered with release liner.

Polyamide 1 was synthesized using a diamine and a diacid with a mole ratio of 2.5 to 1. This yielded an equivalent molecular weight of 637.0 grams per equivalent (g/eq), where the chain was terminated with amine. Polyamide 2 was synthesized using a diamine and a diacid with a mole ratio of 1.7 to 1. This yielded an equivalent molecular weight of 557.4 g/eq, where the chain was terminated with amine. Polyamide 3 was synthesized using a diamine and a diacid with a mole ratio of 1.7 to 1. This yielded an equivalent molecular weight of 555.6 g/eq, where the chain was terminated with amine. The amine end-groups of both Polyamide 1, 2, and 3 contained 95 mole percent (mol %) secondary amine and 5 mol % primary amine.

About 4 grams of each sample was dissolved in a mixture of 100 mL toluene and 50 mL isopropyl alcohol. The solution was titrated with 0.15N hydrochloric acid for amine content. The Equivalent weight (grams/equivalent, g/eq) reported in Table 4 is equal to 1000/amine number.

TABLE 4

Properties of Polyamides 1, 2, and 3

|  | Diamine: Diacid mole ratio | Equivalent Weight, g/eq | Viscosity @ 25° C. and 100 rad/sec, Poise |
|---|---|---|---|
| Polyamide 1 | 2.5 | 637 | 1666 |
| Polyamide 2 | 1.7 | 557.4 | 2120 |
| Polyamide 3 | 1.7 | 555.6 | 2332 |

Comparative Examples 1 to 9 (CE-1 to CE-9) and Examples 10-22 (EX-10 to EX-22

Detailed formulations for Comparative Examples 1 to 9 and Examples 10 to 22 are listed in Tables 5A, 5B, 6A, 6B, 7A, and 7B.

A speed mixer (SPEEDMIXER DAC 150.1 FVZ-K, FlackTek, Inc., Landrum, S.C., USA) was used to thoroughly mix the resins for each Part A and Part B individually, using a speed of 3000 revolutions per minute (rpm) for 3 minutes at room temperature. Any first polyamide, second polyamide, multifunctional amine compound, toughening agent, and accelerator was in Part A. Any epoxy resin and multifunctional (meth)acrylate compound was in Part B.

Part A and Part B were mixed based a ratio of the moles of amine hydrogen (from the polyamide composition, the multifunctional amine compound, and optionally the toughening agent) to the combined moles of epoxide groups and (meth)acryloyl groups. This ratio ranges from 1.8:1 to 1.0:1. Either hand or speed mixing was used for this purpose. The weight ratios of Part A and Part B for each Examples and Comparative Example are listed in the tables that follow.

TABLE 5A

Parts A and B weight percent composition of Comparative Examples CE-1 to CE-9

|  | CE-1 wt % | CE-2 wt % | CE-3 wt % | CE-4 wt % | CE-5 wt % | CE-6 wt % | CE-7 wt % | CE-8 wt % | CE-9 wt % |
|---|---|---|---|---|---|---|---|---|---|
| Part A |  |  |  |  |  |  |  |  |  |
| Polyamide 1 |  | 89.9 | 83.7 | 75.2 | 62.4 | 72.8 | 62.2 | 74.8 |  |
| Polyamide 2 | 84.4 |  |  |  |  |  |  |  |  |
| Polyamide 3 |  |  |  |  |  |  |  |  | 72.9 |
| Polyamide 4 | 14.9 |  |  |  |  | 7.7 |  |  |  |
| Amine 1 |  |  |  |  |  |  |  |  |  |
| Amine 2 |  |  |  |  |  |  |  |  |  |

TABLE 5A-continued

Parts A and B weight percent composition of Comparative Examples CE-1 to CE-9

| | CE-1 wt % | CE-2 wt % | CE-3 wt % | CE-4 wt % | CE-5 wt % | CE-6 wt % | CE-7 wt % | CE-8 wt % | CE-9 wt % |
|---|---|---|---|---|---|---|---|---|---|
| Amine 3 | | 4.4 | 10.2 | 18.3 | 30.3 | 13.0 | 11.1 | 18.2 | 20.3 |
| Toughening Agent 1 | | | | | | | 20.5 | | |
| Toughening Agent 2 | | | | | | | | | |
| Accelerator 1 | | | | | | | | | |
| Accelerator 2 | | | | | | | | | |
| Accelerator 3 | 0.7 | 5.7 | 6.1 | 6.6 | 7.3 | 6.5 | 6.2 | 7.1 | 6.8 |
| Part B | | | | | | | | | |
| Epoxy 1 | 100 | | | | | | | | |
| Acrylate 1 | | 100 | 100 | 100 | 100 | 100 | 100 | 39.4 | 100 |
| Acrylate 2 | | | | | | | | 60.6 | |
| Acrylate 3 | | | | | | | | | |
| Part A:Part B (wt:wt) | 1.7:1 | 4.9:1 | 3.6:1 | 2.6:1 | 1.9:1 | 2.8:1 | 3.3:1 | 2.1:1 | 2.4:1 |

TABLE 5B

Total weight percent of the curable composition of CE-1 to CE-9

| | CE-1 wt % | CE-2 wt % | CE-3 wt % | CE-4 wt % | CE-5 wt % | CE-6 wt % | CE-7 wt % | CE-8 wt % | CE-9 wt % |
|---|---|---|---|---|---|---|---|---|---|
| Total | | | | | | | | | |
| Polyamide 1 | | 74.7 | 65.5 | 54.3 | 40.9 | 53.6 | 47.7 | 50.7 | |
| Polyamide 2 | 53.1 | | | | | | | | |
| Polyamide 3 | | | | | | | | | 51.5 |
| Polyamide 4 | 9.4 | | | | 5.7 | | | | |
| Amine 1 | | | | | | | | | |
| Amine 2 | | | | | | | | | |
| Amine 3 | | 3.7 | 8.0 | 13.2 | 19.9 | 9.6 | 8.5 | 12.3 | 14.3 |
| Toughening Agent 1 | | | | | | | 15.7 | | |
| Toughening Agent 2 | | | | | | | | | |
| Accelerator 1 | | | | | | | | | |
| Accelerator 2 | | | | | | | | | |
| Accelerator 3 | 0.4 | 4.7 | 4.8 | 4.8 | 4.8 | 4.8 | 4.8 | 4.8 | 4.8 |
| Epoxy 1 | 37.0 | | | | | | | | |
| Acrylate 1 | | 16.9 | 21.7 | 27.8 | 34.5 | 26.3 | 23.3 | 12.7 | 29.4 |
| Acrylate 2 | | | | | | | | 19.5 | |
| Acrylate 3 | | | | | | | | | |

TABLE 6A

Parts A and B weight percent composition of EX-10 to EX-16

| | EX-10 wt % | EX-11 wt % | EX-12 wt % | EX-13 wt % | EX-14 wt % | EX-15 wt % | EX-16 wt % |
|---|---|---|---|---|---|---|---|
| Part A | | | | | | | |
| Polyamide 1 | | | | | | | |
| Polyamide 2 | | | 65.8 | 57.6 | 78.4 | 65.7 | 65.4 |
| Polyamide 3 | 63.9 | 66.9 | | | | | |
| Polyamide 4 | 10.8 | 11.3 | 15.6 | 13.6 | | 15.6 | 15.5 |
| Amine 1 | | | 15.6 | | 18.6 | 15.5 | 15.5 |
| Amine 2 | | | | 25.9 | | | |
| Amine 3 | 17.8 | 18.7 | | | | | |
| Toughening Agent 1 | | | | | | | |
| Toughening Agent 2 | | | | | | | |

TABLE 6A-continued

Parts A and B weight percent composition of EX-10 to EX-16

| | EX-10 wt % | EX-11 wt % | EX-12 wt % | EX-13 wt % | EX-14 wt % | EX-15 wt % | EX-16 wt % |
|---|---|---|---|---|---|---|---|
| Accelerator 1 | | 3.1 | | | | | |
| Accelerator 2 | | | 3.1 | 3.0 | 3.0 | 3.2 | 3.6 |
| Accelerator 3 | 7.5 | | | | | | |
| Filler 1 | | | | | | | |
| Part B | | | | | | | |
| Epoxy 1 | 34.6 | 34.6 | 34.6 | 34.6 | 34.6 | 51.4 | 24.1 |
| Acrylate 1 | 65.4 | 65.4 | 65.4 | 65.4 | 65.4 | 48.6 | 22.8 |
| Acrylate 2 | | | | | | | |
| Acrylate 3 | | | | | | | 53.2 |
| Filler 1 | | | | | | | |
| Part A:Part B (wt:wt) | 1.8:1 | 1.7:1 | 1.7:1 | 2.0:1 | 1.8:1 | 1.6:1 | 1.2:1 |

TABLE 6B

Total weight percent of the curable composition of EX-10 to EX-16

| | EX-10 wt % | EX-11 wt % | EX-12 wt % | EX-13 wt % | EX-14 wt % | EX-15 wt % | EX-16 wt % |
|---|---|---|---|---|---|---|---|
| Total | | | | | | | |
| Polyamide 1 | | | | | | | |
| Polyamide 2 | | | 41.4 | 38.4 | 50.4 | 40.4 | 35.7 |
| Polyamide 3 | 41.1 | 42.1 | | | | | |
| Polyamide 4 | 6.9 | 7.1 | 9.8 | 9.1 | | 9.6 | 8.5 |
| Amine 1 | | | 9.8 | | 12.0 | 9.5 | 8.5 |
| Amine 2 | | | | 17.2 | | | |
| Amine 3 | 11.4 | 11.8 | | | | | |
| Toughening Agent 1 | | | | | | | |
| Toughening Agent 2 | | | | | | | |
| Accelerator 1 | | 2.0 | | | | | |
| Accelerator 2 | | | 2.0 | 2.0 | 1.9 | 2.0 | 2.0 |
| Accelerator 3 | 4.8 | | | | | | |
| Epoxy 1 | 12.4 | 12.8 | 12.8 | 11.5 | 12.4 | 19.8 | 11.0 |
| Acrylate 1 | 23.4 | 24.2 | 24.2 | 21.8 | 23.4 | 18.7 | 10.4 |
| Acrylate 2 | | | | | | | |
| Acrylate 3 | | | | | | | 24.2 |
| Filler 1 | | | | | | | |

TABLE 7A

Parts A and B weight percent composition of EX-17 to EX-22

| | EX-17 wt % | EX-18 wt % | EX-19 wt % | EX-20 wt % | EX-21 wt % | EX-22 wt % |
|---|---|---|---|---|---|---|
| Part A | | | | | | |
| Polyamide 1 | | | | | | |
| Polyamide 2 | 65.8 | 65.8 | 65.7 | 65.7 | 66.0 | 56.1 |
| Polyamide 3 | | | | | | |
| Polyamide 4 | 15.6 | 15.6 | 15.6 | 15.6 | | 13.1 |
| Amine 1 | 15.6 | 15.6 | 15.5 | 15.5 | 15.5 | 13.2 |
| Amine 2 | | | | | | |
| Amine 3 | | | | | | |
| Toughening Agent 1 | | | | | | |
| Toughening Agent 2 | | | | | 15.4 | |
| Accelerator 1 | | | | | | |
| Accelerator 2 | 3.1 | 3.1 | 3.2 | 3.2 | 3.1 | 2.6 |
| Accelerator 3 | | | | | | |
| Filler 1 | | | | | | 15 |
| Part B | | | | | | |
| Epoxy 1 | 34.6 | 34.6 | 51.4 | 51.4 | 51.4 | 43.7 |
| Acrylate 1 | 65.4 | 65.4 | 48.6 | 48.6 | 48.6 | 41.3 |
| Acrylate 2 | | | | | | |
| Acrylate 3 | | | | | | |
| Filler 1 | | | | | | 15 |
| Part A:Part B (wt:wt) | 1.3:1 | 0.93:1 | 1.2:1 | 0.83:1 | 1.76:1 | 1.6:1 |

TABLE 7B

Total weight percent of the curable composition of EX-17 to EX-22

| | EX-17 wt % | EX-18 wt % | EX-19 wt % | EX-20 wt % | EX-21 wt % | EX-22 wt % |
|---|---|---|---|---|---|---|
| Total | | | | | | |
| Polyamide 1 | | | | | | |
| Polyamide 2 | 37.2 | 31.7 | 35.8 | 29.8 | 42.1 | 34.5 |
| Polyamide 3 | | | | | | |

TABLE 7B-continued

Total weight percent of the curable composition of EX-17 to EX-22

|  | EX-17 wt % | EX-18 wt % | EX-19 wt % | EX-20 wt % | EX-21 wt % | EX-22 wt % |
|---|---|---|---|---|---|---|
| Polyamide 4 | 8.8 | 7.5 | 8.5 | 7.1 |  | 8.1 |
| Amine 1 | 8.8 | 7.5 | 8.5 | 7.0 | 9.9 | 8.1 |
| Amine 2 |  |  |  |  |  |  |
| Amine 3 |  |  |  |  |  |  |
| Toughening Agent 1 |  |  |  |  |  |  |
| Toughening Agent 2 |  |  |  | 9.8 |  |  |
| Accelerator 1 |  |  |  |  |  |  |
| Accelerator 2 | 1.8 | 1.5 | 1.7 | 1.5 | 2.0 | 1.6 |
| Accelerator 3 |  |  |  |  |  |  |
| Epoxy 1 | 15.0 | 17.9 | 23.4 | 28.1 | 18.6 | 16.8 |
| Acrylate 1 | 28.4 | 33.9 | 22.1 | 26.6 | 17.6 | 15.9 |
| Acrylate 2 |  |  |  |  |  |  |
| Acrylate 3 |  |  |  |  |  |  |
| Filler 1 |  |  |  |  |  | 15 |

Results

Green Strength Build-Up in Polyamide/Acrylate Two-Part Adhesive

Table 8 shows the results of OLS strength on bare aluminum substrate after 10 minutes at room temperature (RT) for CE-1 to CE-5 and CE-9. CE-1 contained a first polyamide and a second polyamide, and epoxy resin. There was no multifunctional amine compound or multifunctional (meth)acrylate compound. No overlap shear was measurable after 10 minutes at room temperature.

CE-2 to CE-5 and CE-9 contained a first polyamide, a multifunctional amine compound (mXDA), and a multifunctional amine compound. There was no epoxy resin. Increasing the equivalent ratio of mXDA to the first polyamide from 1:2.2 in CE-2 to 5:2.2 in CE-4, the OLS on aluminum substrate increased from 0.09 megapascals (MPa) to 0.40 MPa after being cured at room temperature for 10 minutes. Further increasing the equivalent ratio of mXDA to the first polyamide from 5:2.2 in CE-4 to 10:2.2 in CE-5, the OLS strength on aluminum substrate decreased from 0.40 MPa to 0.10 MPa.

CE-9 is similar in composition to CE-4 but used a first polyamide with a reduced equivalent weight. This change improved the 10 minute OLS green strength at room temperature up to 0.71 MPa.

TABLE 8

Green strength build-up with respect to amount of mXDA: overlap shear strength after 10 minutes at room temperature

| EXAMPLE | OLS on Aluminum, MPa |
|---|---|
| CE-1 | Not measurable |
| CE-2 | 0.09 |
| CE-3 | 0.17 |
| CE-4 | 0.40 |
| CE-5 | 0.10 |
| CE-9 | 0.71 |

Comparing the OLS of CE-3, CE-6, and CE-7 shows the effect of adding either a secondary polyamide or a toughening agent as seen in Table 9. CE-3 contained a first polyamide, a multifunctional amine (mXDA), a multifunctional (meth)acrylate. CE-6 added a second polyamide and CE-7 added a toughening agent. That is, CE-6 and CE-7 replaced 0.7 equivalents out of 2.5 equivalents of first polyamide with either VERSAMID 150 (a second polyamide) or HYPRO 1300X42 ATB (a toughening agent). The OLS green strength increased from 0.17 MPa in CE-3 to 0.31 MPa in CE-6 and to 0.40 MPa in CE-7.

TABLE 9

Green strength build-up with respect to addition of second polyamide or a toughening agent: overlap shear strength after 10 minutes at room temperature

| EXAMPLE | OLS on Aluminum, MPa |
|---|---|
| CE-3 | 0.17 |
| CE-6 | 0.31 |
| CE-7 | 0.40 |

Table 10 shows the importance of the amount (and type) of multifunctional (meth)acrylate on the OLS green strength at room temperature on aluminum substrate. By replacing half of the equivalent amount of trifunctional (meth)acrylate (TMPTA) in CE-4 with a difunctional diacrylate (tricyclodecane dimethanol diacrylate, SR833S) in CE-8, the OLS strength on aluminum substrate after being cured for 10 minutes at room temperature was not measurable.

TABLE 10

Green strength build-up with respect to multifunctional acrylates: overlap shear strength after 10 minutes at room temperature

| EXAMPLE | OLS on Aluminum, MPa |
|---|---|
| CE-4 | 0.4 |
| CE-8 | Not measurable |

Importance of Amine/Epoxy as Co-Curative for OLS Strength After Being Fully Cured CE-1 contained a first polyamide, a second polyamide, and an epoxy resin. There is no multifunctional amine compound or multifunctional (meth)acrylate compound. CE-9 contained a first polyamide, a multifunctional amine compound, and a multifunctional (meth)acrylate compound. There was no epoxy compound. After being fully cured (100° C. for 60 minutes), the OLS strength on aluminum for CE-9 (1.84 MPa—see Table 11) is much lower than for CE-1 (9.9 MPa—see Table 13). The effect of the combination of the epoxy resin, first polyamide, multifunctional amine compound, and multifunctional (meth)acrylate compound for Example 10 (EX-10) is shown Table 11. In EX-10, 2 equivalents of a secondary polyamide (VERSAMID 150) was combined with 2.2 equivalents of the first polyamide and 2 equivalents of epoxy resin EPON 828 was combined with 7.2 equivalents of the multifunctional (meth)acrylate compound TMPTA. The OLS strength after being cured at 100° C. for 60 minutes improved from 1.84 MPa in CE-9 to 4.67 MPa for EX-10. However, due to the addition of new components in the system, the 10 minute green OLS strength was not measurable for EX-10. Accelerator 3, which was DBU, was used for both CE-9 and EX-10. This accelerator is not as effective for rapidly increasing the green strength as other accelerators such as Lewis acids.

TABLE 11

Polyamide/epoxy to improve the final OLS strength of polyamide/acrylate two part structural adhesive

| | | CE-9 | EX-10 |
|---|---|---|---|
| OLS on Aluminum, MPa | RT for 10 minutes | 0.707 | Not measurable |
| | 100° C. for 1 hour | 1.84 | 4.67 |

The green strengths of various samples were compared in Table 12. CE-1 contained a first polyamide, a second polyamide, and epoxy resin. It contained no multifunctional amine compound and no multifunctional (meth)acrylate. Without the multifunctional (meth)acrylate and multifunctional (meth)acrylate compound, good OLS could not be obtained with room temperature curing of CE-1 for up to 30 minutes. All the examples (EX-11, EX-12, EX-15, and EX-13) contained a first polyamide, a second polyamide, a multifunctional amine compound, a multifunctional (meth)acrylate, and an epoxy resin. The OLS obtained for the samples that were cured at room temperature was dependent on the catalyst that was selected. EX-11 contained Accelerator 1, which was calcium nitrate tetrahydrate. EX-12, EX-15, and EX-13 contained Accelerator 2, which was calcium triflate.

The use of calcium nitrate tetrahydrate in EX-11 rather than DBU in EX-10 did not improve the 10 minute room temperature OLS strength. However, the use of the calcium triflate as the catalyst did improve the 10 minute room temperature OLS strength as shown in Table 12.

TABLE 12

The Comparison of different multifunctional amine compounds, multifunctional acrylate, and catalyst on green strength

| | | CE-1 | EX-11 | EX-12 | EX-15 | EX-13 |
|---|---|---|---|---|---|---|
| OLS on Aluminum, MPa | RT for 10 minutes | Not Measurable | Not Measurable | 0.27 | 0.01 | 0.39 |
| | RT for 20 minutes | Not Measurable | Not Measurable | 0.71 | 0.34 | 0.43 |
| | RT for 30 minutes | Not Measurable | 0.40 | 0.60 | 1.10 | 0.73 |

Furthermore, Table 13 shows that compared with CE-1, EX-12 has lower OLS strength for both room temperature and 120° C. curing, and lower tensile strength and elongation at break after being fully cured. EX-12 cures faster at room temperature than CE-1. Compared to EX-12, EX-15 contains less of the multifunctional (meth)acrylate and has improved OLS strength and tensile strength. EX-15 has good room temperature green strength (1.10 MPa OLS for 30 minutes at room temperature), fast curing rate (6.0 MPa OLS for 24 hours at room temperature), and good tensile strength (5.5 MPa for 24 hours at room temperature) with extremely good elongation at break (149.7%).

TABLE 13

Comparison of different components on adhesion and mechanical performance

| | | CE-1 | EX-12 | EX-15 |
|---|---|---|---|---|
| RT for 24 hours | OLS on Al, MPa | 9.9 | 3.1 | 6.0 |
| | Tensile strength, MPa | 0.13 | 1.8 | 5.5 |
| | Modulus, MPa | 2.4 | 3.5 | 6.4 |
| | Elongation at break, % | >800 | 70.0 | 149.7 |
| 120° C. for 1 hour | OLS on Al, MPa | 19.2 | 7.1 | 11.4 |
| | Tensile strength, MPa | 12.0 | 2.3 | 8.4 |
| | Modulus, MPa | 300 | 3.6 | 33.5 |
| | Elongation at break, % | 102.2 | 84.0 | 148.7 |

Table 14 shows that, as with the Comparative Examples that did not contain an epoxy resin, materials such as VERSAMID 150 (a second polyamide) and CARDOLITE NC540 (a toughening agent) can also improve the OLS strength for the Examples. Example 14 contained a first polyamide, a single multifunctional amine compound, an epoxy resin, and a multifunctional (meth)acrylate compound. Example 12 added a second polyamide and Example 21 added an amino-functionalized toughening agent.

TABLE 14

The effect of VERSAMID 150 and CARDOLITE NC540 for strength improvement

| | | EX-12 | EX-14 | EX-21 |
|---|---|---|---|---|
| RT for 24 hours | OLS on Al, MPa | 3.1 | 1.8 | 4.8 |
| | Tensile strength, MPa | 1.8 | 1.5 | 8.9 |
| | Modulus, MPa | 3.5 | 3.2 | 177.8 |
| | Elongation at break, % | 70.0 | 73 | 83.7 |
| 120° C. for 1 hour | OLS on Al, MPa | 7.1 | 6.0 | 10.0 |
| | Tensile strength, MPa | 2.3 | 2.1 | 1.6 |
| | Modulus, MPa | 3.6 | 2.4 | 2.0 |
| | Elongation at break, % | 84.0 | 116.5 | 295.4 |

Table 15 compares two different multifunctional acylates: TMPTA and ethoxylated multifunctionalized acrylate ethoxylated (9) trimethylolpropane triacrylate (SR502). EX-12 contained only TMPTA, while EX-16 contained a mixture of TMPTA ethoxylated (9) trimethylolpropane triacrylate. At both room temperature curing and 120° C. curing conditions, EX-12 was better than EX-16.

TABLE 15

The choice of different multifunctional (meth)acrylates for the adhesion and mechanical performance after curing

| | | EX-12 | EX-16 |
|---|---|---|---|
| RT for 24 hours | OLS on Al, MPa | 3.1 | 1.5 |
| | Tensile strength, MPa | 1.8 | 1.0 |
| | Modulus, MPa | 3.5 | 3.1 |
| | Elongation at break, % | 70.0 | 45 |
| 120° C. for 1 hour | OLS on Al, MPa | 7.1 | 2.5 |
| | Tensile strength, MPa | 2.3 | 0.9 |
| | Modulus, MPa | 3.6 | 2.3 |
| | Elongation at break, % | 84.0 | 54 |

Table 16 shows that by reducing the mixing ratio of Part A to Part B, the strength of the system increased especially in the examples (EX-17, EX-18, EX-19 and EX-20) after post-curing at 120° C. for 1 hour.

TABLE 16

The effect of mixing ratio of Part A and B.

| | | EX-12 | EX-17 | EX-18 | EX-15 | EX-19 | EX-20 |
|---|---|---|---|---|---|---|---|
| | Part A:Part B (wt:wt) | 1.7:1 | 1.3:1 | 0.93:1 | 1.6:1 | 1.2:1 | 0.83:1 |
| RT for 24 hours | OLS on Al (MPa) | 3.1 | 3.2 | 2.9 | 6.0 | 8.3 | 3.9 |
| | Tensile strength (MPa) | 1.8 | 1.8 | 0.92 | 5.5 | 4.0 | 1.4 |
| | Modulus (MPa) | 3.5 | 4.0 | 1.8 | 6.4 | 5.8 | 2.7 |
| | Elongation at break (%) | 70.0 | 59 | 73 | 149.7 | 112.4 | 91.8 |
| 120° C. for 1 hour | OLS on Al (MPa) | 7.1 | 7.7 | 11.0 | 11.4 | 17.0 | 16.6 |
| | Tensile strength (MPa) | 2.3 | 8.4 | 6.4 | 8.4 | 13.2 | 14.5 |
| | Modulus (MPa) | 3.6 | 9.2 | 9.9 | 33.5 | 174 | 230 |
| | Elongation at break (%) | 84.0 | 77 | 71.3 | 148.7 | 44.6 | 32.0 |

Different metal substrates can be bonded by the polyamide/epoxy/acrylate adhesives. Table 17 shows the OLS strength of the cured adhesives on aluminum to aluminum, aluminum to steel, and steel to steel. And the OLS strength from aluminum to aluminum is higher than other substrate combinations.

TABLE 17

The effect of different substrates on OLS strength

| | | EX-15 | | |
|---|---|---|---|---|
| Substrates | | Al to Al | Al to Steel | Steel to Steel |
| RT for 24 hours | OLS, MPa | 6.0 | 5.1 | 4.6 |
| 120° C. for 1 hour | OLS, MPa | 11.4 | 9.3 | 9.6 |

Filler can be loaded in the system. In Table 18, EX-22 contains 15 weight percent carbon black while EX-15 contains no carbon black. The carbon block increases the OLS strength for both curing conditions, but sacrifices the toughness.

TABLE 18

The effect of carbon black loading

| | | EX-15 | EX-22 |
|---|---|---|---|
| | Carbon Black, wt % | 0 | 15 |
| RT for 24 hours | OLS on Al, MPa | 6.0 | 6.7 |
| | Tensile strength, MPa | 5.5 | 4.1 |
| | Modulus, MPa | 6.4 | 20.9 |
| | Elongation at break, % | 149.7 | 107.8 |

TABLE 18-continued

The effect of carbon black loading

| | EX-15 | EX-22 |
|---|---|---|
| 120° C. for 1 hour OLS on Al, MPa | 11.4 | 13.1 |
| Tensile strength, MPa | 8.4 | 4.6 |
| Modulus, MPa | 33.5 | 8.6 |
| Elongation at break, % | 148.7 | 112.8 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given to enable one of ordinary skill in the art to practice the claimed disclosure, is not to be construed as limiting the scope of the disclosure, which is defined by the claims and all equivalents thereto.

What is claimed:

1. A curable composition comprising:
    a) a curable component comprising
      1) an epoxy resin;
      2) a polyamide composition comprising a first polyamide, the first polyamide having a tertiary amido in the polymeric backbone thereof and having two terminal amino groups, the first polyamide being a reaction product of a dicarboxylic acid with a diamine of Formula (I)

$$R^3—NH—R^4—NH—R^5 \quad (I)$$

wherein
  $R^3$ is alkyl, aryl, alkaryl, aralkyl, heteroalkyl having an oxygen heteroatom, heteroaryl, or $R^3$ combines with $R^5$ to form an alkylene group;
  $R^4$ is an alkylene, heteroalkylene having an oxygen heteroatom, arylene, heteroarylene, or a combination thereof; and
  $R^5$ is an alkyl, aryl, alkaryl, aralkyl, heteroalkyl having an oxygen heteroatom, heteroaryl, or $R^5$ combined with $R^3$ to form an alkylene group; and
wherein 75 to 100 mole percent of the amido groups in the first polyamide are tertiary amido groups;
      3) a multifunctional amine compound comprising from 2 to 20 carbon atoms and having two or more amino groups that are primary amino groups and/or secondary amino groups;
      4) a multifunctional (meth)acrylate compound having 2 to 5 (meth)acryloyl groups; and b) optionally, an inorganic filler, wherein the curable composition comprises less than 25 weight percent inorganic filler based on the total weight of the curable composition.

2. The curable composition of claim 1, wherein the curable component comprises 5 to 50 weight percent epoxy resin based on a total weight of the curable component.

3. The curable composition of claim 1, wherein the curable component comprises 10 to 60 weight percent polyamide composition based on a total weight of the curable component.

4. The curable composition of claim 1, wherein the polyamide composition comprises 20 to 100 weight percent first polyamide based on a total weight of the polyamide composition.

5. The curable composition of claim 1, wherein 90 to 100 mole percent of the amido groups in the first polyamide are tertiary amido groups.

6. The curable composition of claim 1, wherein the polyamide composition further comprises a second polyamide having 0 to less than 30 mole percent tertiary amido groups based on total content of amido groups in the polymeric backbone thereof and having terminal amino groups.

7. The curable composition of claim 6, wherein the polyamide composition comprises 20 to 100 weight percent of the first polyamide and 0 to 80 weight percent of the second polyamide.

8. The curable composition of claim 1, wherein the curable component comprises 5 to 60 weight percent of the multifunctional (meth)acrylate compound based on a total weight of the curable component.

9. The curable composition of claim 8, wherein the curable component comprises at least one multifunctional (meth)acrylate compound having at least three (meth)acryloyl groups.

10. The curable composition of claim 9, wherein the curable component comprises 1 to 50 weight percent multifunctional amine compound.

11. The curable composition of claim 1, wherein the curable component further comprises a catalyst comprising a Lewis acid.

12. The curable composition of claim 1, wherein the curable composition comprises 0 to 10 weight percent inorganic filler.

13. A cured composition, wherein the total curable composition comprises a reaction product of the curable composition of claim 1.

14. An article comprising a first substrate and the cured composition of claim 13 adjacent to the substrate.

15. The article of claim 14, wherein the article comprises a second substrate and the cured composition of claim 13 bonds the first substrate to the second substrate.

16. The curable composition of claim 1, wherein the dicarboxylic acid is a dimer acid.

* * * * *